United States Patent
Zhang et al.

(10) Patent No.: US 12,328,434 B1
(45) Date of Patent: Jun. 10, 2025

(54) INTRA PREDICTION IN VIDEO CODING

(71) Applicant: Qualcomm Incorporated, San Diego, CA (US)

(72) Inventors: Kai Zhang, San Diego, CA (US); Jianle Chen, San Diego, CA (US); Xin Zhao, Santa Clara, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/963,121

(22) Filed: Oct. 10, 2022

Related U.S. Application Data

(63) Continuation of application No. 17/006,518, filed on Aug. 28, 2020, now Pat. No. 11,470,330, which is a
(Continued)

(51) Int. Cl.
*H04N 19/159* (2014.01)
*H04N 19/109* (2014.01)
(Continued)

(52) U.S. Cl.
CPC ......... *H04N 19/159* (2014.11); *H04N 19/109* (2014.11); *H04N 19/11* (2014.11);
(Continued)

(58) Field of Classification Search
CPC .... H04N 19/159; H04N 19/593; H04N 19/70; H04N 19/186; H04N 19/109; H04N 19/11; H04N 19/176
See application file for complete search history.

(56) References Cited

U.S. PATENT DOCUMENTS 9,083,974 B2   7/2015 Jeon et al.
10,764,587 B2   9/2020 Zhang et al.
(Continued)

FOREIGN PATENT DOCUMENTS

CN   105120264 A   12/2015
CO     6731124 A2    8/2013
(Continued)

OTHER PUBLICATIONS

Chen J., et al., "Algorithm Description of Joint Exploration Test Model 2," Joint Video Exploration Team (JVET) of ITU-T SG 16 WP 3 and ISO/IEC JTC 1/SC 29/WG 11, 2nd Meeting: San Diego, USA, Feb. 20-26, 2016, JVET-B1001, Mar. 25, 2016, 32 pages.
(Continued)

*Primary Examiner* — Nam D Pham
(74) *Attorney, Agent, or Firm* — Shumaker & Sieffert, P.A.

(57) ABSTRACT

An apparatus configured to encode or decode video data that includes a memory configured to store a plurality of reconstructed samples of video data and at least one processor, in communication with the memory, that is configured to intra predict a first prediction block based on a first angular intra prediction mode and a first one or more reconstructed samples among the plurality of reconstructed samples where the first angular intra prediction mode is among a plurality of angular intra prediction modes, intra predict a second prediction block based on a second angular intra prediction mode and a second one or more reconstructed samples among the plurality of reconstructed samples where the second angular prediction mode is associated with an angular prediction direction that is different from angular prediction directions associated with the plurality of angular prediction modes, and encode or decode a current block
(Continued)

based on the first prediction block and the second prediction block.

16 Claims, 21 Drawing Sheets

Related U.S. Application Data continuation of application No. 16/020,179, filed on Jun. 27, 2018, now Pat. No. 10,764,587.

(60) Provisional application No. 62/527,928, filed on Jun. 30, 2017, provisional application No. 62/527,903, filed on Jun. 30, 2017, provisional application No. 62/527,795, filed on Jun. 30, 2017.

(51) Int. Cl.
*H04N 19/11* (2014.01)
*H04N 19/176* (2014.01)
*H04N 19/186* (2014.01)
*H04N 19/593* (2014.01)
*H04N 19/70* (2014.01)

(52) U.S. Cl.
CPC ......... *H04N 19/176* (2014.11); *H04N 19/186* (2014.11); *H04N 19/593* (2014.11); *H04N 19/70* (2014.11)

(56) References Cited

U.S. PATENT DOCUMENTS

| | | | |
|---|---|---|---|
| 10,944,963 | B2 | 3/2021 | Yu et al. |
| 11,032,550 | B2 | 6/2021 | Ye et al. |
| 2012/0314766 | A1 | 12/2012 | Chien et al. |
| 2013/0114696 | A1 | 5/2013 | Liu |
| 2015/0023405 | A1 | 1/2015 | Joshi et al. |
| 2016/0373741 | A1 | 12/2016 | Zhao et al. |
| 2018/0324418 | A1 | 11/2018 | Koo et al. |
| 2019/0141318 | A1* | 5/2019 | Li ................. H04N 19/159 |
| 2019/0174128 | A1 | 6/2019 | Jang et al. |
| 2019/0208199 | A1 | 7/2019 | Cho et al. |
| 2019/0222839 | A1 | 7/2019 | Jang et al. |
| 2019/0238839 | A1 | 8/2019 | Ikeda |
| 2019/0356909 | A1 | 11/2019 | Lainema |
| 2020/0021804 | A1 | 1/2020 | Jun et al. |
| 2020/0051288 | A1 | 2/2020 | Lim et al. |
| 2020/0396463 | A1 | 12/2020 | Zhang et al. |

FOREIGN PATENT DOCUMENTS

| | | | |
|---|---|---|---|
| EP | 2704435 | A2 | 3/2014 |
| EP | 3499884 | A1 | 6/2019 |
| EP | 3566450 | A1 | 11/2019 |
| JP | 2012028858 | A | 2/2012 |
| JP | 2020503785 | A | 1/2020 |
| WO | 2014050971 | A1 | 4/2014 |
| WO | WO-2016048183 | A1 | 3/2016 |
| WO | 2016091727 | A1 | 6/2016 |
| WO | 2017065532 | A1 | 4/2017 |
| WO | 2017190288 | A1 | 11/2017 |
| WO | 2018127624 | A1 | 7/2018 |

OTHER PUBLICATIONS

Chen J., et al., "Algorithm Description of Joint Exploration Test Model 4", 4. JVET Meeting, Oct. 15, 2016-Oct. 21, 2016, Chengdu, (The Joint Video Exploration Team of ISO/IEC JTC1/SC29/WG 11 and ITU-T SG.16), URL: http://phenix.int-evry.fr/jvet/, No. JVET-D1001_V1, Oct. 28, 2016 (Oct. 28, 2016), 38 Pages, XP030150460, p. 20.

Huang H., "EE2.1: Quadtree Plus Binary Tree Structure Integration with JEM Tools," Joint Video Exploration Team (JVET) of ITU-T SG 16 WP 3 and ISO/IEC JTC 1/SC 29/WG 11, 3rd Meeting: Geneva, CH, May 26-Jun. 1, 2016, JVET-C0024, 5 pp.

International Search Report and Written Opinion—PCT/US2018/039975—ISA/EPO—Nov. 2, 2018.

Seregin V., et al., "Block Shape Dependent Intra Mode Coding", 4th JVET Meeting, Chengdu, (The Joint Video Exploration Team of ISO/IEC JTC1/SC29/WG11 and ITU-T SG.16 WP 3), JVET-D0114r1, URL: http://phenix.int-evry.fr/jvet/, CN, Oct. 15-21, 2016, 3 pages.

Yu Y., "On MPM Determination and Planar Mode Signaling", JCTVC-H0516-r3, Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, pp. 1-6.

European Search Report—EP23174732—Search Authority—Munich—Nov. 3, 2023.

Choi J-A., et al., "H.264/AVC Based near Lossless Intra Codec Using Line-based Prediction and Modified CABAC", Multimedia and Expo (ICME), International Conference on IEEE, Jul. 11, 2011, 5 Pages.

Lai C., et al., "New Intra Prediction Using the Correlation Between Pixels and Lines", 1. JCT-VC Meeting, Apr. 15, 2010-Apr. 23, 2010, Dresden, Joint Collaborative Team on Video Coding (JCT-VC) of ITU-T SG16 WP3 and ISO/IEC JTC1/ SC29/WG11, No. JCTVC-A025, Apr. 20, 2010, XP030007512, pp. 1-4.

* cited by examiner

INTRA PREDICTION IN VIDEO CODING

The present application is a continuation of U.S. patent application Ser. No. 17/006,518, filed Aug. 28, 2020, which is a continuation of U.S. patent application Ser. No. 16/020,179, filed Jun. 27, 2018, which is now U.S. Pat. No. 10,764,587 issued on Sep. 1, 2020, which claims priority to U.S. Provisional Application No. 62/527,795, filed Jun. 30, 2017, U.S. Provisional Application No. 62/527,903, filed Jun. 30, 2017, and U.S. Provisional Application No. 62/527,928, filed Jun. 30, 2017, each of which is incorporated by reference in its entirety.

TECHNICAL FIELD

This disclosure is related to video coding (e.g. video encoding and/or video decoding). For example, some aspects relate to intra prediction in video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently finalized High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for intra prediction of samples of a block of video data. In particular, this disclosure describes techniques for predicting samples of a current block utilizing intra prediction techniques including at least one of an extended angular intra prediction mode(s), cascade intra prediction, and/or inversed-linear model intra prediction.

In one example, a method of encoding or decoding video data includes reconstructing a plurality of samples associated with a first row of a first block of video data, generating a plurality of predicted samples associated with a second row of a second block based on a cascading technique where the cascading technique includes utilization of an angle associated with a first angular intra-prediction mode to generate the plurality of predicted samples associated with the second row of the second block, and encoding or decoding the second block based on the plurality of predicted samples associated with the second row.

In another example, an apparatus is configured to encode or decode video data includes a reference picture memory configured to store a plurality of reconstructed samples associated with a first row of a first block of video data and at least one processor, in communication with the reference picture memory, that is configured to generate a plurality of predicted samples associated with a second row of a second block based on a cascading technique where the cascading technique includes utilization of an angle associated with a first angular intra-prediction mode to generate the plurality of predicted samples associated with the second row of the second block and to encode or decode the second block based on the plurality of predicted samples associated with the second row.

In another example, an apparatus configured to encode or decode video data includes means for reconstructing a plurality of samples associated with a first row of a first block of video data, means for generating a plurality of predicted samples associated with a second row of a second block based on a cascading technique where the cascading technique comprising utilization of an angle associated with a first angular intra-prediction mode to generate the plurality of predicted samples associated with the second row of the second block, and means for encoding or decoding the second block based on the plurality of predicted samples associated with the second row.

In another example, a computer-readable storage medium stores instructions that, when executed, causes one or more processors configured to encode or decode video data to reconstruct a plurality of samples associated with a first row of a first block of video data, generate a plurality of predicted samples associated with a second row of a second block based on a cascading technique where the cascading technique comprising utilization of an angle associated with a first angular intra-prediction mode to generate the plurality of predicted samples associated with the second row of the second block, and encode or decode the second block based on the plurality of predicted samples associated with the second row.

The details of one or more examples are set forth in the accompanying drawings and the description below. Other features, objects, and advantages will be apparent from the description and drawings, and from the claims.

DETAILED DESCRIPTION

Various video coding standards, including the recently developed High Efficiency Video Coding (HEVC) standard include predictive coding modes for video blocks, where a block currently being coded is predicted based on an already coded block of video data. In an intra prediction mode, the current block is predicted based on one or more previously coded, neighboring blocks in the same picture as the current block, while in an inter prediction mode the current block is predicted based on an already coded block in a different picture. In inter prediction mode, the process of determining a block of a previously coded frame to use as a predictive block is sometimes referred to as motion estimation, which is generally performed by a video encoder, and the process of identifying and retrieving a predictive block is sometimes referred to as motion compensation, which is performed by both video encoders and video decoders. Extensions of HEVC and successors to HEVC may also use additional coding modes, such as intra block copy, dictionary, and palette coding modes.

This disclosure describes techniques related to intra prediction. The techniques of this disclosure may be used in the context of advanced video codecs, such as the next generation of video coding standards or image coding standards.

Various techniques in this disclosure may be described with reference to a video coder, which is intended to be a generic term that can refer to either a video encoder or a video decoder. Unless explicitly stated otherwise, it should not be assumed that techniques described with respect to a video encoder or a video decoder cannot be performed by the other of a video encoder or a video decoder. For example, in many instances, a video decoder performs the same, or sometimes a reciprocal, coding technique as a video encoder in order to decode encoded video data. In many instances, a video encoder also includes a video decoding loop, and thus the video encoder performs video decoding as part of encoding video data. Thus, unless stated otherwise, the techniques described in this disclosure with respect to a video decoder may also be performed by a video encoder, and vice versa.

This disclosure may also use terms such as current block, current picture, etc. In the context of this disclosure, the term "current" is intended to identify a block or picture that is currently being coded, as opposed to, for example, previously or already coded block or picture, or a yet to be coded block or picture.

Figure 1:
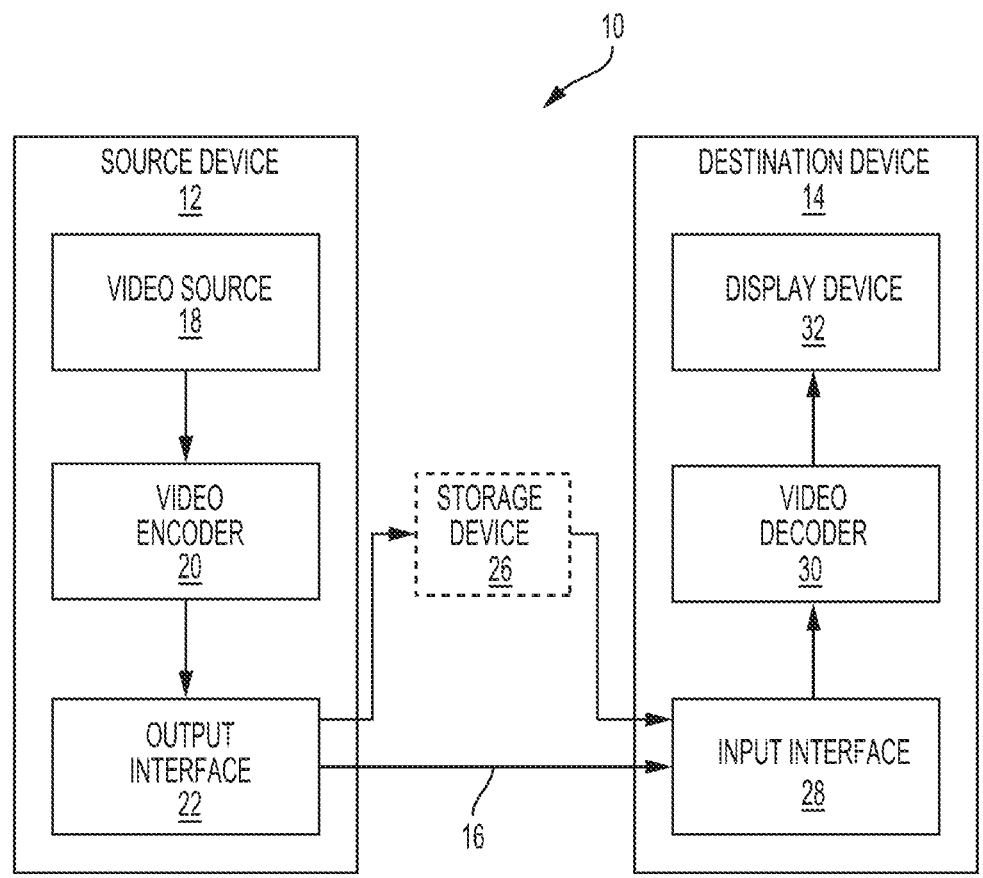
FIG. 1 is a block diagram illustrating an example video encoding and decoding system that may utilize the techniques described in this disclosure.

FIG. 1 is a block diagram illustrating an example video encoding and decoding system 10 that may utilize techniques for prediction described in this disclosure, for example, extended angular intra prediction modes, cascade intra prediction and/or inversed-linear model intra prediction. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for intra prediction techniques described in this disclosure. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for intra prediction techniques described in this disclosure may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video compression standard, such as the recently finalized High Efficiency Video Coding (HEVC) standard and may conform to the HEVC Test Model (HM). Video encoder 20 and video decoder 30 may additionally operate according to an HEVC extension, such as the range extension, the multiview extension (MV-HEVC), or the scalable extension (SHVC) which have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

Video encoder 20 and video decoder 30 may also operate according to other proprietary or industry standards, such as the ITU-T H.264 standard, alternatively referred to as ISO/IEC MPEG-4, Part 10, Advanced Video Coding (AVC), or extensions of such standards, such as the Scalable Video Coding (SVC) and Multi-view Video Coding (MVC) extensions. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, and ISO/IEC MPEG-4 Visual.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. One version of reference software, i.e., Joint Exploration Model 2 (JEM 2) can be downloaded from: https://jvet.hhi.fraunhofer.de/svn/sn_HMJEMSoftware/tags/HM-16.6-JEM-2.0/. An algorithm for JEM2 is described in J. Chen, E. Alshina, G. J. Sullivan, J.-R. Ohm, J. Boyce, "Algorithm description of Joint Exploration Test Model 2", JVET-B1001, San Diego, March 2016, which description is incorporated herein by reference. Another version of the reference software, i.e., Joint Exploration Model 3 (JEM 3) can be downloaded from: https://jvet.hhi.fraunhofer.de/svn/svn_HMJEMSoftware/tags/HM-16.6-JEM-3.0/. The algorithm description for JEM3 may also be referred to as JVET-C1001 and is incorporated herein by reference. An algorithm for JEM4 is described in J. Chen, E. Alshina, G. J. Sullivan, J.-R. Ohm, J. Boyce, "Algorithm Description of Joint Exploration Test Model 4," JVET-D1001, October 2016 and is incorporated herein by reference.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions as well as other video compression techniques (e.g., non-standardized codecs).

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In HEVC and other video coding specifications, a video sequence typically includes a series of pictures. Pictures may also be referred to as "frames." In one example approach, a picture may include three sample arrays, denoted $S_L$, $S_{Cb}$, and $S_{Cr}$. In such an example approach, $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). The size of a CTU can be ranges from 16×16 to 64×64 in the HEVC main profile (although technically 8×8 CTU sizes can also be supported). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

Each CU is coded with one mode. When a CU is inter coded, the CU may be further partitioned into 2 or 4 prediction units PUs or become just one PU when further partitioning does not apply. When two PUs are present in one CU, the two PUs can be half size rectangles or two rectangle size with ¼ or ¾ size of the CU. When a CU is inter coded, one set of motion information may be present for each PU. In addition, each PU is coded with a unique inter-prediction mode to derive the set of motion information.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of Network Abstraction Layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

QTBT structure, as described in H. Huang, K. Zhang, Y.-W. Huang, S. Lei, "EE2.1: Quadtree plus binary tree structure integration with JEM tools", JVET-C0024, June 2016 (incorporated herein by reference), is adopted in the JEM4 software. In the QTBT structure, a CTB is firstly partitioned by a quadtree structure. The quadtree leaf nodes are further partitioned by a binary tree structure. The binary tree leaf nodes, namely coding blocks (CBs), are used for prediction and transform without any further partitioning. For P and B slices the luma and chroma CTBs in one CTU share the same QTBT structure. For I slice the luma CTB is partitioned into CBs by a QTBT structure, and two chroma CTBs are partitioned into chroma CBs by another QTBT structure.

A CTU (or CTB for I slice), which is the root node of a quadtree, is firstly partitioned by a quadtree, where the quadtree splitting of one node can be iterated until the node reaches the minimum allowed quadtree leaf node size (MinQTSize). If the quadtree leaf node size is not larger than the maximum allowed binary tree root node size (MaxBTSize), it can be further partitioned by a binary tree. The binary tree splitting of one node can be iterated until the node reaches the minimum allowed binary tree leaf node size (MinBTSize) or the maximum allowed binary tree depth (MaxBTDepth). The binary tree leaf node, namely CU (or CB for I slice), will be used for prediction (e.g. intra-picture or inter-picture prediction) and transform without any further partitioning. There are two splitting types in the binary tree splitting: symmetric horizontal splitting and symmetric vertical splitting.

In one example of the QTBT partitioning structure, the CTU size is set to 128×128 (luma samples and corresponding 64×64 Cb/Cr samples), the MinQTSize is set to 16×16, the MaxBTSize is set to 64×64, the MinBTSize (for both width and height) is set to 4, and the MaxBTDepth is set to 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node will be further partitioned by the binary tree. Therefore the quadtree leaf node is also the root node for the binary tree and its binary tree depth is defined as 0. When the binary tree depth reaches MaxBTDepth (i.e., 4), it implies no further splitting. When the binary tree node has a width equal to MinBTSize (i.e., 4), it implies no further horizontal splitting. Similarly, when the binary tree node has a height equal to MinBTSize, it implies no further vertical splitting. The leaf nodes of the binary tree, namely CUs, are further processed by prediction and transform without any further partitioning.

Figure 2A:
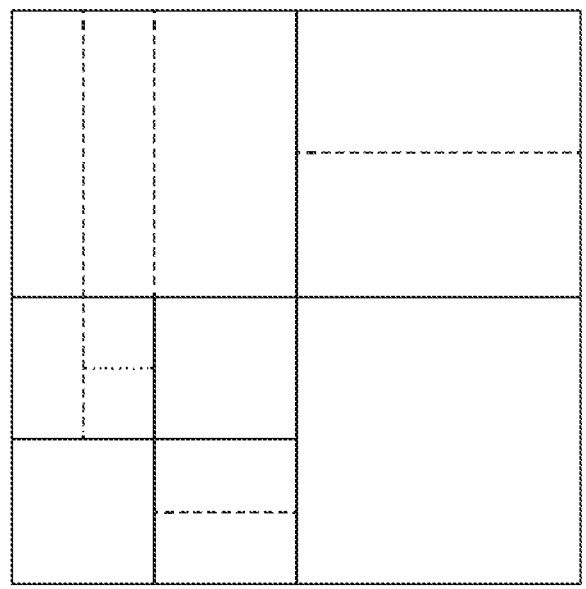
FIGS. 2A and 2B illustrate an example of block partitioning by using QTBT and a corresponding tree structure.
Figure 2B:
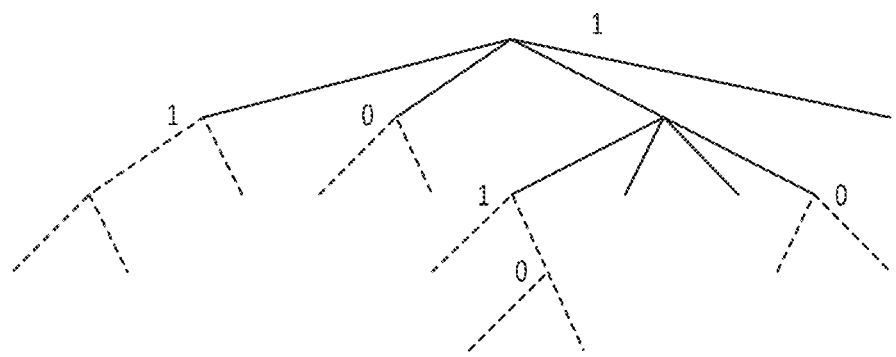

FIG. 2A illustrates an example of block partitioning by using QTBT, and FIG. 2B illustrates the corresponding tree structure. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since it always splits a block horizontally and vertically into 4 sub-blocks of equal size.

For I slice, a luma-chroma-separated block partitioning structure is proposed. The luma component of one CTU (i.e., the luma CTB) is partitioned by a QTBT structure into luma CBs, and the two chroma components of that CTU (i.e., the two chroma CTBs) are partitioned by another QTBT structure into chroma CBs.

For P and B slice, the block partitioning structure for luma and chroma is shared. That is, one CTU (including both luma and chroma) is partitioned by one QTBT structure into CUs.

Figure 3:
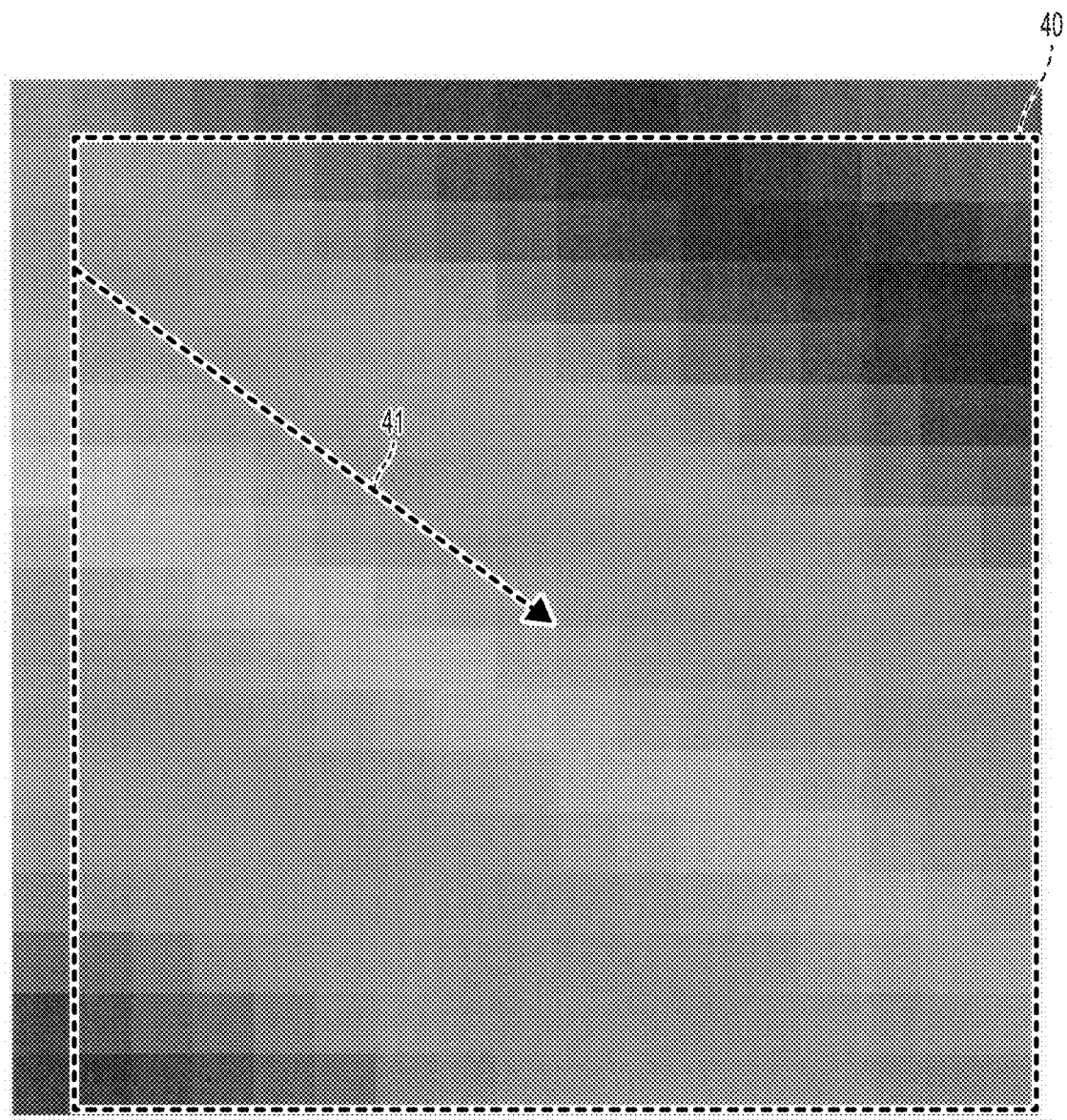
FIG. 3. shows an example of intra prediction for a 16×16 block.

FIG. 3 shows an example of intra prediction for a 16×16 block. When coding a block in an intra prediction mode, the video coder performs image block prediction using spatially neighboring reconstructed image samples. A typical example of intra prediction for a 16×16 image block is shown in FIG. 3. With Intra prediction, the 16×16 image block 40 is predicted by the above and left neighboring reconstructed samples (reference samples) along a selected prediction direction (as indicated by arrow 41).

Figure 4:
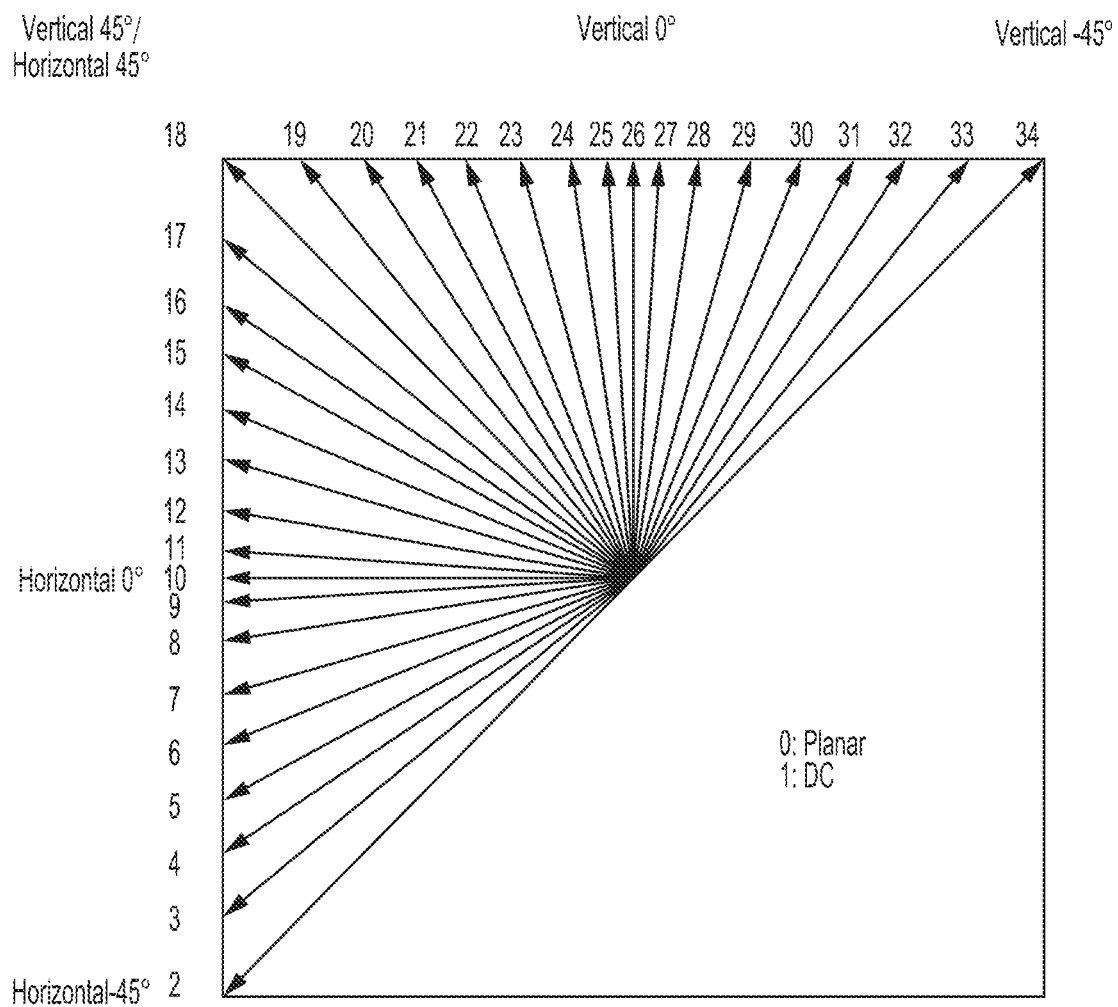
FIG. 4 is a graphical illustration of the 35 Intra prediction modes defined in HEVC.

FIG. 4 shows the 35 intra prediction modes defined in HEVC. In HEVC, for the intra prediction of a luma block, a video coder may select from 35 available modes, including the Planar mode, DC mode, and 33 angular modes, as indicated in FIG. 4.

Figure 5:
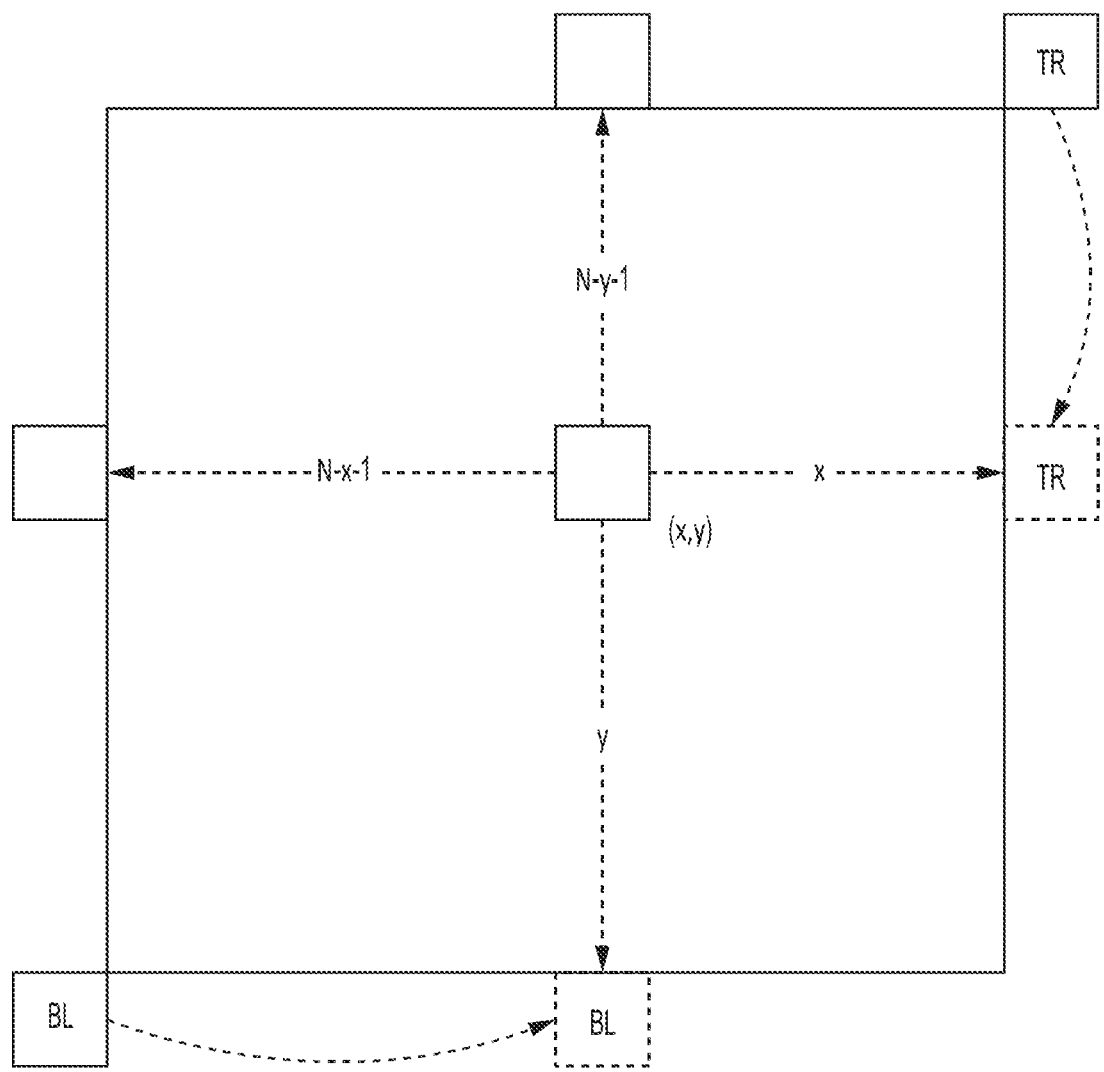
FIG. 5 is an illustration of the generation of a prediction sample with Planar mode in accordance with HEVC.

For Planar mode, which is a frequently used intra prediction mode, the prediction sample is generated as shown in FIG. 5. To perform Planar prediction for an N×N block, for each sample $p_{xy}$ of the block located at coordinates (x, y), the prediction value is calculated (i.e., determined) using four specific neighboring reconstructed samples (e.g., reference samples) with a bilinear filter. The four reference samples include the top-right reconstructed sample denoted as "TR", the bottom-left reconstructed sample denoted as "BL", the reconstructed sample located at the same column ($r_{x,-1}$) of the current sample denoted by "L" and the reconstructed sample located at row ($r_{-1,y}$) of the current sample denoted by "T". The planar mode can be formulated as below:

$$p_{xy}=((N-x-1)\cdot L+(N-y-1)\cdot T+(x+1)\cdot TR+(y+1)\cdot BL)>> (\text{Log2}(N)+1) \qquad (1)$$

Figure 6:
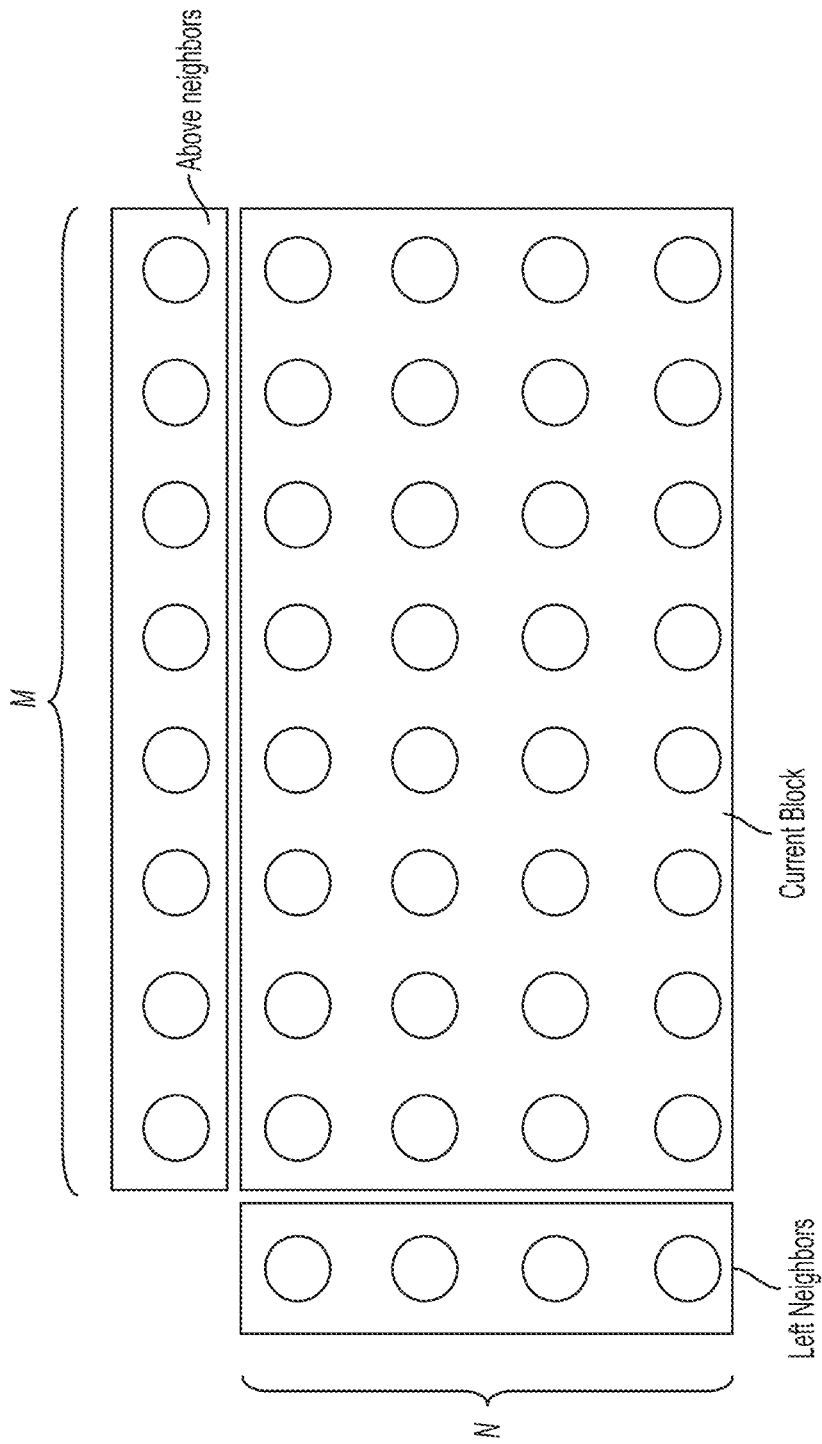
FIG. 6 is another illustration of the generation of a prediction sample with Planar mode in accordance with HEVC.

For the DC mode, the prediction block is simply filled with the DC value (i.e., the average value of the neighboring reconstructed samples) as $$p_{xy} = \text{DC value} = \frac{1}{M+N}\left(\sum_{k=0}^{M-1}A_k + \sum_{k=0}^{N-1}L_k\right), \qquad (2)$$

where M is the number of above neighboring reconstructed samples, N is the number of left neighboring reconstructed samples, $A_k$ represents the k-th above neighboring reconstructed sample and $L_k$ represents the k-th left neighboring reconstructed sample as shown in FIG. 6. When all of the neighboring samples are not available (e.g., all neighboring samples do not exist or all neighboring samples have not been encoded/decoded yet), a default value of 1<<(bit-Depth−1) is assigned to each of the unavailable samples. Here, the variable "bitDepth" denotes the bit depth (i.e., the number of bits used) of either the luma component or the chroma component. When a subset (e.g., a partial number of but not all) of neighboring samples are not available, the unavailable samples are padded by the available samples. Generally, both the Planar mode and the DC mode are applied for modeling smoothly varying and constant image regions.

Although HEVC defines 35 intra prediction modes for intra prediction, for example, for luma blocks, there remains some problems with these conventional modes. For some intra prediction cases, the existing modes (including the 33 angular modes) may not represent the most optimal prediction modes for coding a given block.

Linear Model (LM) chroma intra prediction was proposed to JCT-VC in http://phenix.int-evry.fr/jct/doc_end_user/documents/5_Geneva/wg11/JCTVC-E0266-v4.zip. It has also been proposed to JVET as described in the Section 2.2.4 in http://phenix.int-evry.fr/jvet/doc_end_user/documents/3_Geneva/wg11/JVET-C1001-v3.zip. LM mode supposes there is linear relationship between the luma and chroma components. LM mode explores the neighboring reconstructed pixels by utilizing the linear regression approach to figure out the relationship. When LM mode is used, the chroma values may be predicted from reconstructed luma values of same block as follows.

$$Pred_c[x,y] = \alpha \cdot Rec_L'[x,y] + \beta \quad (3)$$

where $Pred_c$ indicates the prediction of chroma samples in a block and $Rec_L$ indicates the reconstructed luma samples in the block. Parameters $\alpha$ and $\beta$ are derived from causal reconstructed samples around the current block.

The sampling ratio of chroma components is half of that of luma component and has 0.5 pixel phase difference in vertical direction in YUV420 sampling. Reconstructed luma is downsampled in vertical direction and subsample in horizontal direction to match size and phase of chroma signal, as follows.

$$Rec_L'[x,y] = (Rec_L[2x,2y] + Rec_L[2x,2y+1]) >> 1 \quad (4)$$

The LM method utilizes linear least square solution between causal reconstructed data of downsampled luma component and causal chroma component to derive model parameters $\alpha$ and $\beta$. For example, model parameters $\alpha$ and $\beta$ may be derived as follows:

$$\alpha = \frac{I \cdot \sum_{i=0}^{I} Rec_C(i) \cdot Rec_L'(i) - \sum_{i=0}^{I} Rec_C(i) \cdot \sum_{i=0}^{I} Rec_L'(i)}{I \cdot \sum_{i=0}^{I} Rec_L'(i) \cdot Rec_L'(i) - \left(\sum_{i=0}^{I} Rec_L'(i)\right)^2} = \frac{A_1}{A_2} \quad (5)$$

$$\beta = \frac{\sum_{i=0}^{I} Rec_C(i) - \alpha \cdot \sum_{i=0}^{I} Rec_L'(i)}{I} \quad (6)$$

where $Rec_c(i)$ and $Rec_L'(i)$ indicate reconstructed chroma samples and downsampled luma samples around the target block, I indicates total samples number of neighboring data.

Figure 7:
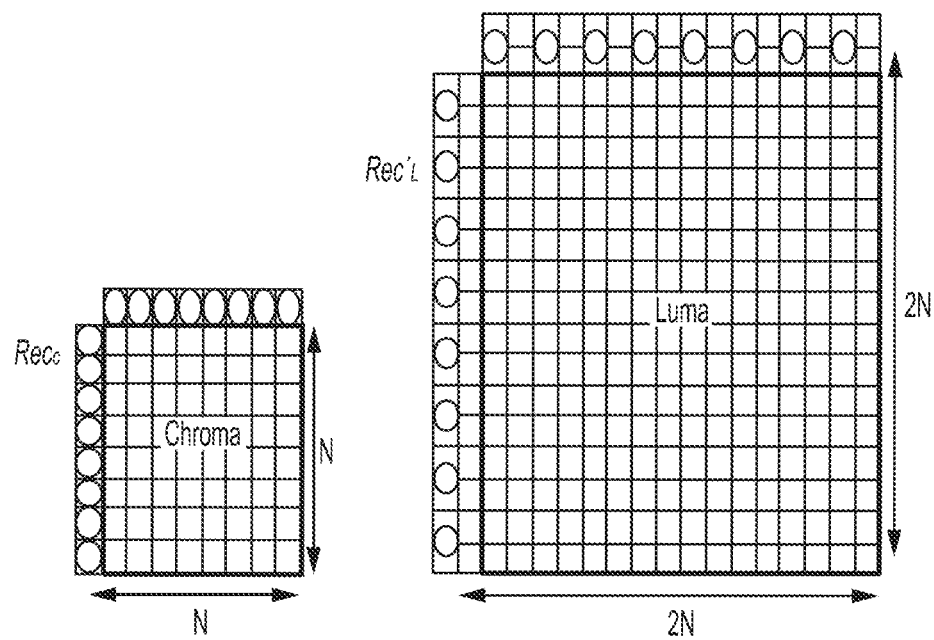
FIG. 7 is a conceptual diagram of example locations of samples used for deriving model parameter α and model parameter β for linear model chroma intra prediction.

FIG. 7 is a graphical diagram of locations of samples used for deriving model parameter $\alpha$ and model parameter $\beta$. As illustrated in FIG. 7, only left and above causal samples marked as gray circles are involved in the calculation to keep total samples number I as power of 2. For a target N×N chroma block, when both left and above causal samples are available, total involved samples number is 2N; when only left or above causal samples are available, total involved samples number is N.

Figure 8:
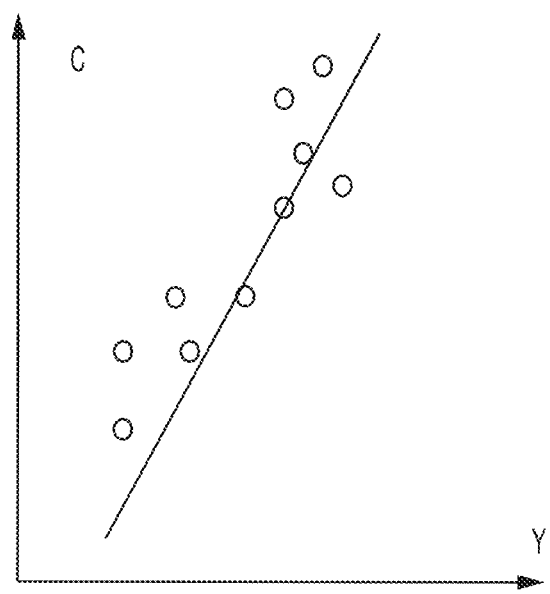
FIG. 8 is a graph of an example of linear regression between luma (Y) components and chroma (C) components.

FIG. 8 is a graphical diagram of an example of linear regression between luma (Y) components and chroma (C) components. As illustrated in FIG. 8, according to one example, a linear relationship between luma and chroma components may be solved using a linear regression method. In FIG. 8, a point on the graphical diagram corresponds to a pair of the sample $Rec_L'[x, y]$, $Rec_c[x, y]$).

Figure 9:
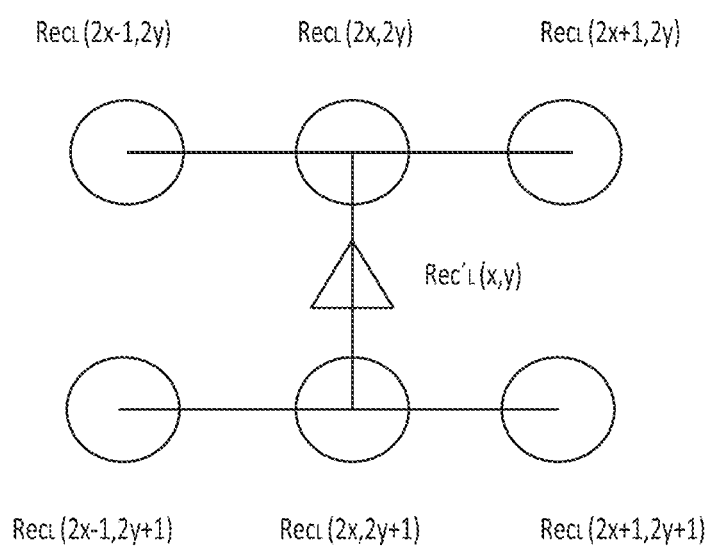
FIG. 9 is a schematic diagram of example luma sample down-sampling.

FIG. 9 is a schematic diagram of luma sample downsampling in JEM3.0. JVET adopts a more sophisticated luma sample down-sampling filter for LM mode in JEM3.0, as illustrated in FIG. 9, where $$Rec_L'[x,y]=(2 \cdot Rec_L[2x,2y]+2 \cdot Rec_L[2x,2y+1]+Rec_L[2x-1,2y]+Rec_L[2x+1,2y]+Rec_L[2x-1,2y+1]+Rec_L[2x+1,2y+1]+4)>>3 \quad (7)$$

When the samples are located at the picture boundary, two-tap filter is applied as shown in equation (7), above.

In an effort to potentially address problems discussed herein and/or improve over existing intra prediction techniques, this disclosure describes techniques for predicting samples which utilize angular intra prediction modes besides (i.e., other than and/or in addition to) angular intra prediction modes between Horizontal −45° and Vertical −45° (e.g., the 33 angular prediction modes defined in HEVC). Specifically, this disclosure contemplates the use of angular intra prediction modes beyond Horizontal −45° or beyond Vertical −45° for prediction. The angular intra prediction modes, techniques, methods, and/or various examples disclosed herein may be applied individually and/or in any combination.

As noted above, the existing intra prediction modes (including the 33 angular modes) defined in HEVC may not provide for the most optimal prediction for coding a given block in all circumstances. However, utilization of the extended angular intra prediction modes (also referred to herein as extended intra prediction modes or extended intra prediction) as described in accordance with the present disclosure may, in some cases, necessitate an increase of the complexity of the encoder design (e.g., algorithmic implementations and/or operations) of a video encoder (e.g., video encoder 20) in order to realize coding gains and increase prediction quality that would be achieved by the increase in prediction variety that the use of extended angular intra prediction may provide. For example, a video encoder, such as video encoder 20, supporting the extended intra prediction modes of the present disclosure may be required, in some circumstances, to evaluate additional (i.e., in addition to those image samples evaluated in conjunction with the intra prediction modes defined in HEVC) reconstructed image samples (or reference samples) along at least one additional prediction direction associated with the extended intra prediction modes in order to determine and/or select a particular reference sample(s) to predict the current block. In other words, a video encoder (e.g., video encoder 20) may be required to perform further computations than those typically required for utilization of conventional intra prediction modes provided by, for example, HEVC in order improve the likelihood of identifying better reference sample(s) (i.e., prediction candidate(s)) for predicting the current block in accordance with the present disclosure.

Figure 10A:
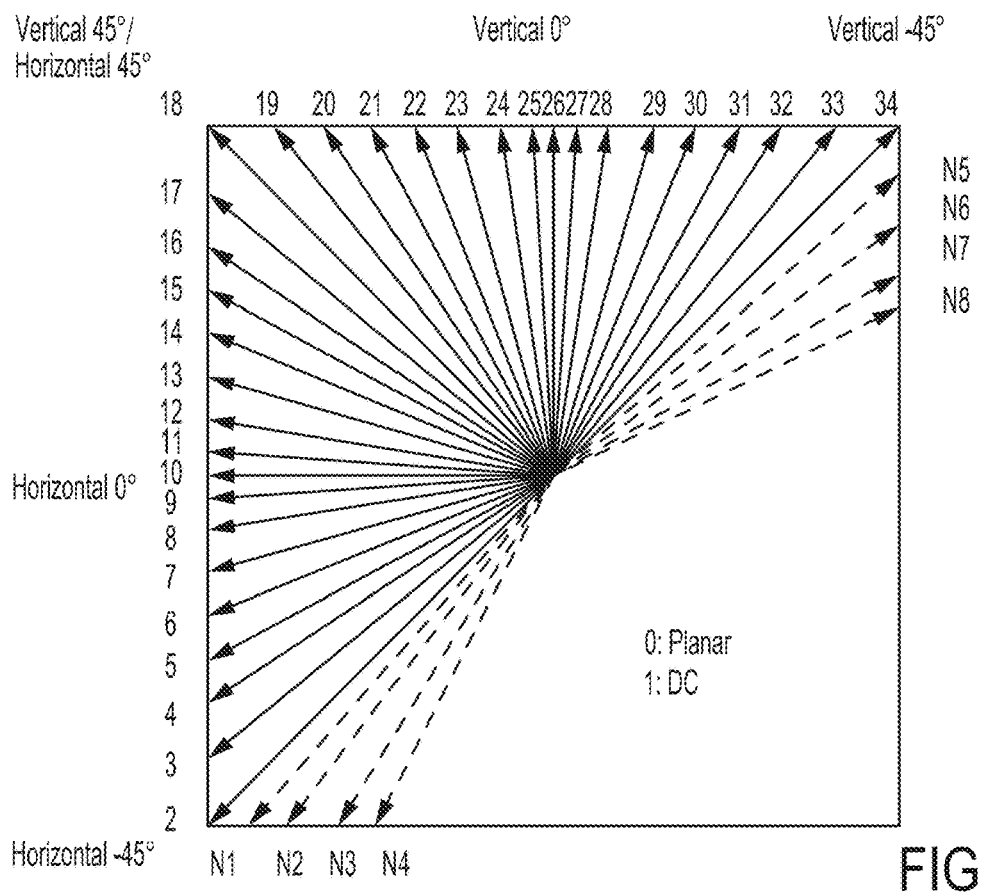
FIGS. 10A and 10B are graphical illustrations of extended angular intra prediction modes that may be utilized for intra prediction in accordance with this disclosure.

FIG. 10A illustrates an example of the some of the extended angular intra prediction modes contemplated by the present disclosure. In this example, as shown, there are four angular modes (illustrated with dashed arrows) beyond Horizontal −45° (i.e., mode 2 as defined in HEVC and depicted in FIG. 4) which are tagged (i.e., identified) as N1, N2, N3 and N4. Further, in this particular example, there are four additional angular modes (illustrated with dashed arrows) beyond Vertical −45° (i.e., mode 34 defined in HEVC and depicted in FIG. 4) which are tagged as N5, N6, N7 and N8.

Figure 10B:
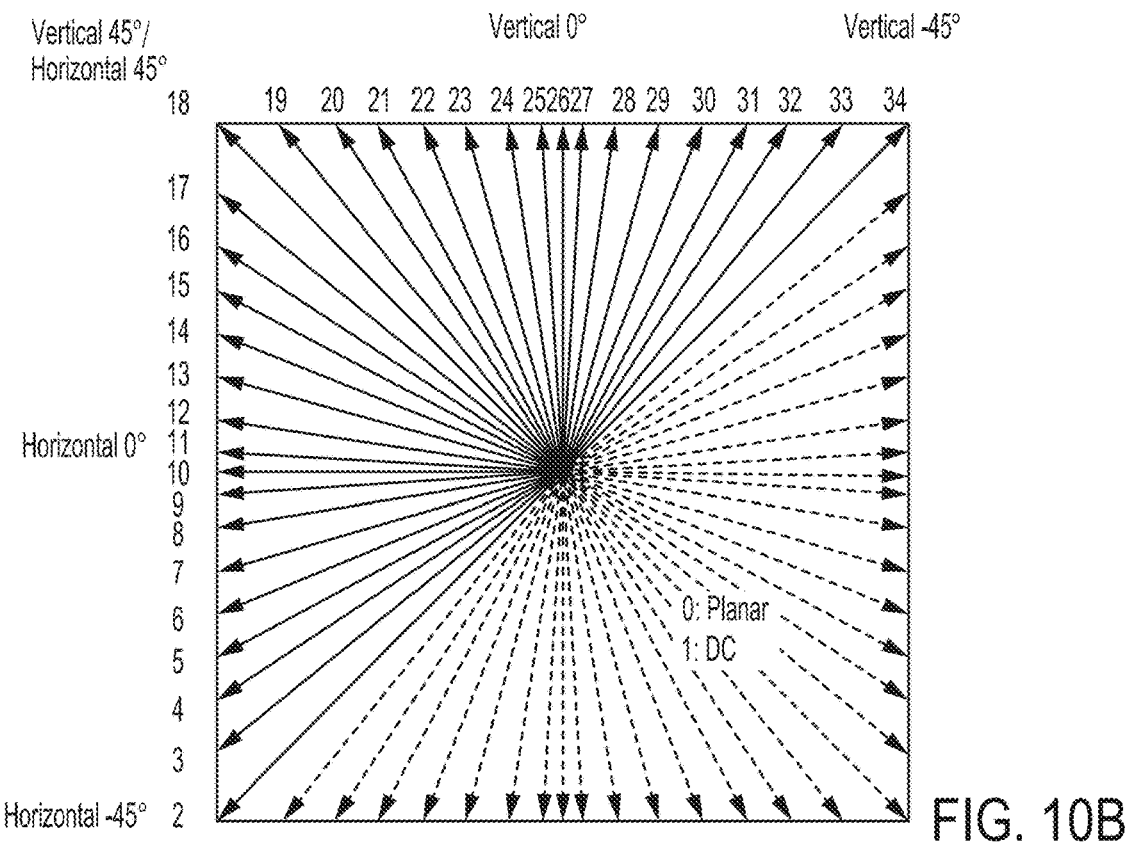

FIG. 10B illustrates another example of the some of the extended angular intra prediction modes contemplated by the present disclosure. In this example, when the surrounding reconstructed samples are available (e.g., intra coded block surrounded by inter coded blocks), some (e.g., all) the extended angular intra prediction directions (illustrated with dashed arrows) may be applied. In other words, based on a determination that the current block being intra-coded is surrounded by inter coded blocks, the extended angular intra prediction directions illustrated in FIG. 10B may be determined to be available for predicting samples of the current block.

Figure 11:
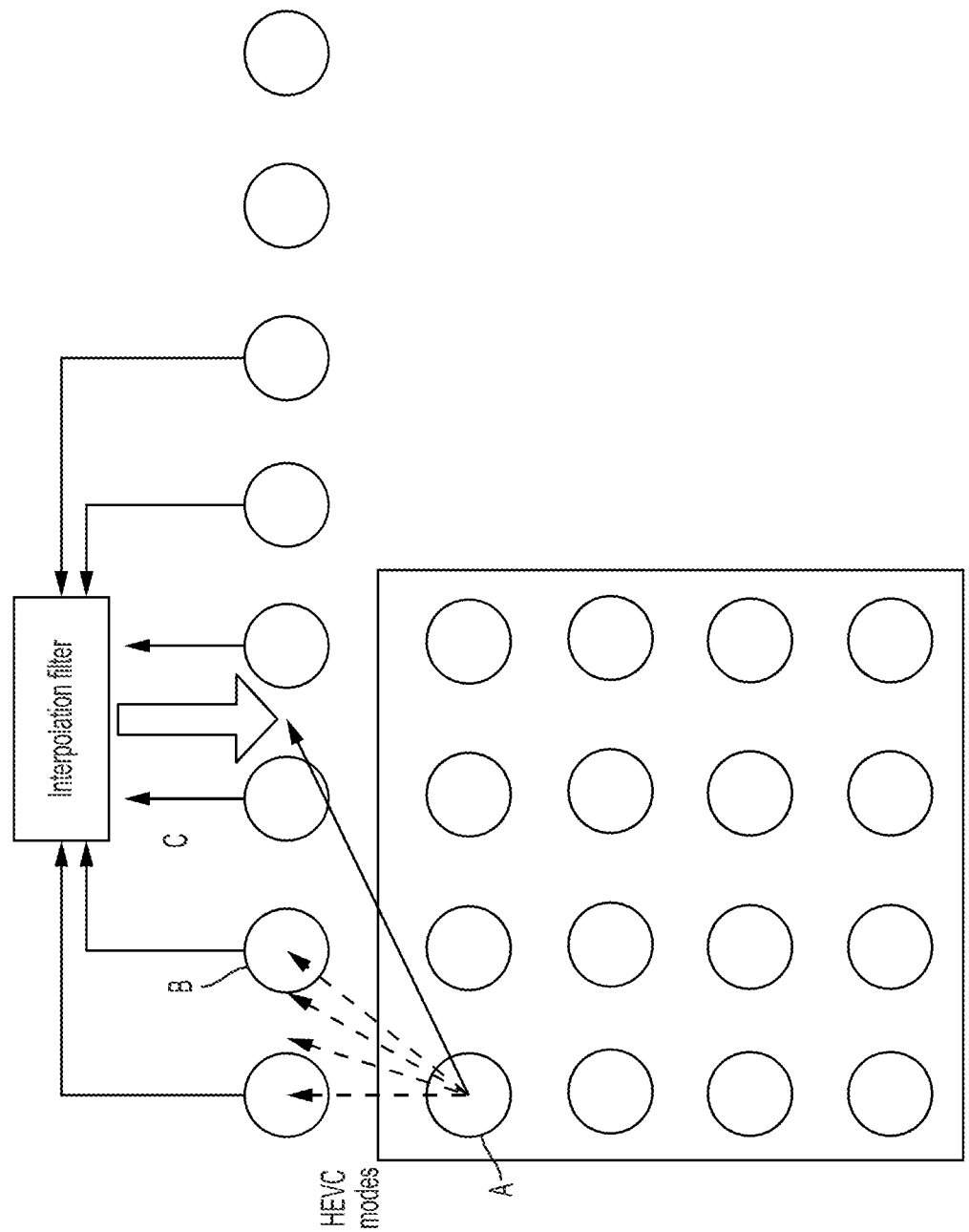
FIG. 11 illustrates an example of predicting a sample from a reconstructed sample(s) using an extended intra prediction mode in accordance with this disclosure.

In some implementations of the present disclosure, samples within a current block are predicted by reconstructed samples on a top line (e.g., a reconstructed line of samples of a neighboring block) based on the extended intra prediction modes beyond Vertical −45° being used. FIG. 11 shows an example of predicting a sample (marked as "A") of a current block from reconstructed samples of a top line with an extended angular intra prediction mode of the present disclosure. With the angle beyond Vertical −45° (i.e., an extended angular intra prediction mode illustrated with a solid arrow), Sample "A" is projected to a sample, which may be a sub-sample, on the top line. Compared to the angular prediction modes in HEVC (marked as dash arrows), the proposed extended angular intra prediction mode in accordance with the present disclosure enables projection of a sample or sub-sample beyond the sample (marked as "B") which the angle Vertical −45° is projected to. In one example, sample "A" is projected to a sub-sample, which can be interpolated with the neighboring reconstructed samples on the top line by an interpolation filter. In one example, sample "A" is projected to a sub-sample, which can be approximated by a neighboring reconstructed sample. In FIG. 10, sample "A" can be projected to sample "C" as an approximation.

Figure 12:
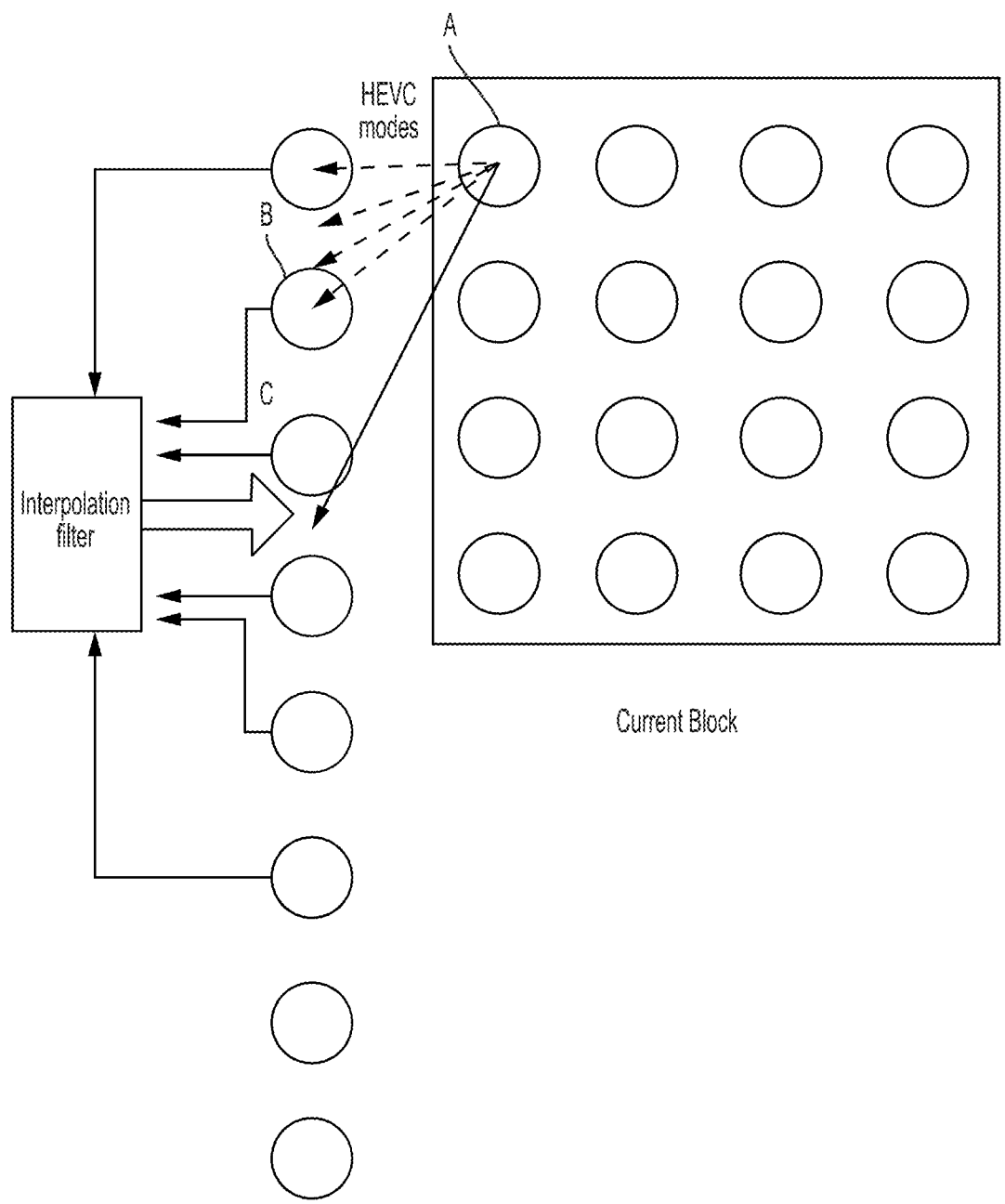
FIG. 12 illustrates another example of predicting a sample from a reconstructed sample(s) using an extended intra prediction mode in accordance with this disclosure.

In another example of the present disclosure, samples of the current block may be predicted by reconstructed samples of a left line utilizing an extended angular intra prediction mode beyond Horizontal −45°. FIG. 12 illustrates an example of predicting a sample (marked as "A") from the reconstructed samples on a left line with an extended angular intra prediction mode of the present disclosure. With the angle beyond Horizontal −45° (i.e., an extended angular intra prediction mode illustrated with a solid arrow), Sample "A" is projected to a sample, which may be a sub-sample, on the top line. Compared to the angular prediction modes in HEVC (illustrated as dashed arrows in FIG. 12), the proposed extended angular prediction mode of the present disclosure enables projection a sample or sub-sample beyond the sample (marked as "B") which the angle Horizontal −45° is projected to. In one example, sample "A" is projected to a sub-sample, which may be interpolated with neighboring reconstructed samples on the left line by an interpolation filter. In one example, sample "A" is projected to a sub-sample, which can be approximated by a neighboring reconstructed sample. In FIG. 12, sample "A" can be projected to sample "C" as an approximation.

Figure 13:
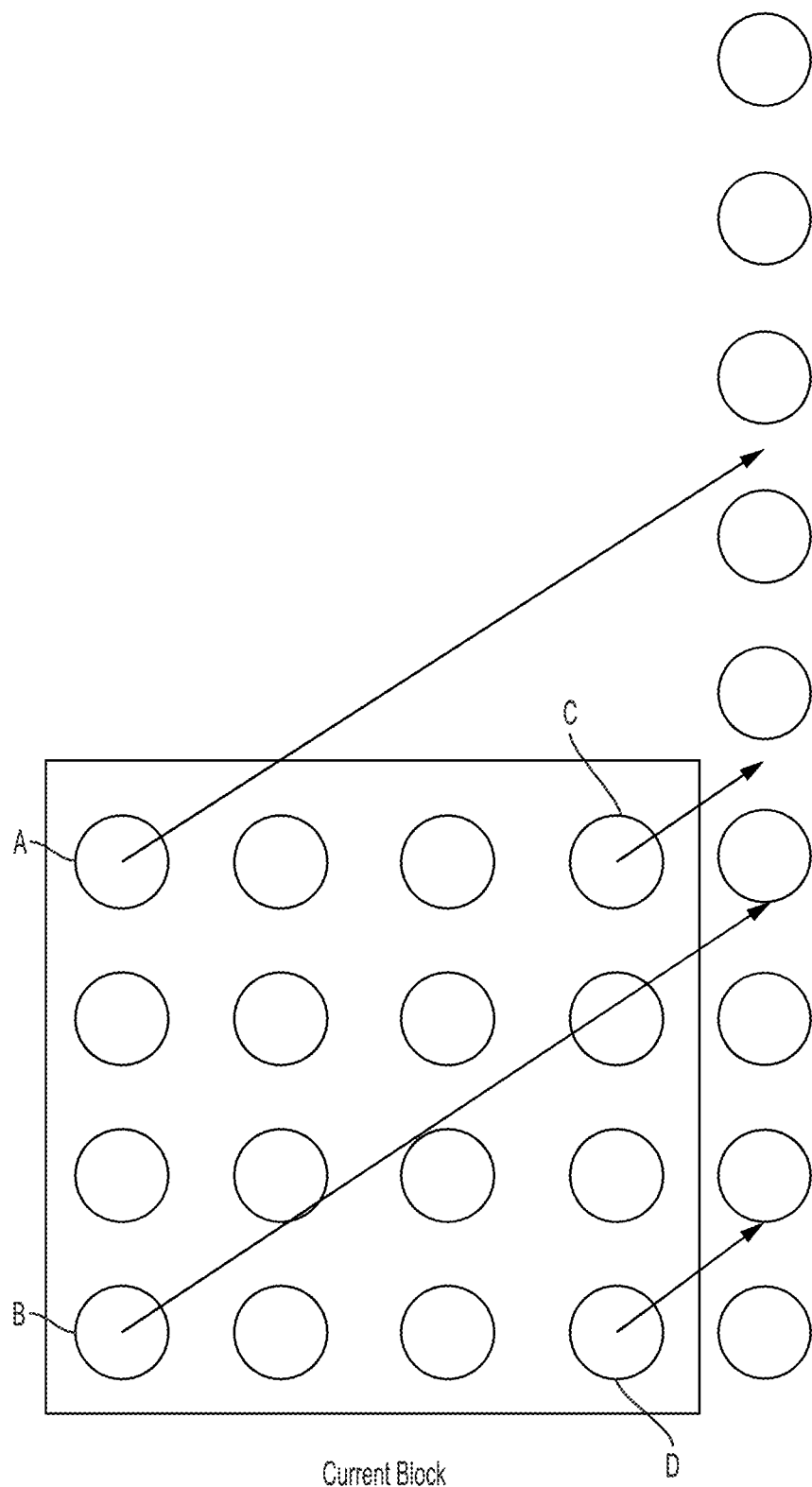
FIG. 13 illustrates an example of predicting sample(s) from a reconstructed sample(s) using an extended intra prediction mode in accordance with this disclosure.

In yet another example of the present disclosure, samples in a current block may be predicted by samples on the right line (e.g., a reconstructed line of samples of a neighboring block) utilizing an extended angular intra prediction mode beyond Vertical −45°. FIG. 13 illustrates an example of predicting samples (marked as "A", "B", "C" and "D") of the current block from the reconstructed samples on the right line of a reconstructed neighboring block with an extended angular intra prediction mode of the present disclosure. With the angle beyond Vertical −45° (i.e., the extended angular intra prediction mode illustrated with solid arrows), sample "A" is projected to a sample, which may be a sub-sample, on the right line. In this example, sample "A" is projected to a sub-sample, which can be interpolated with the neighboring reconstructed samples on the right line by an interpolation filter. In another example, sample "A" is projected to a sub-sample, which can be approximated by a neighboring reconstructed sample.

Figure 14:
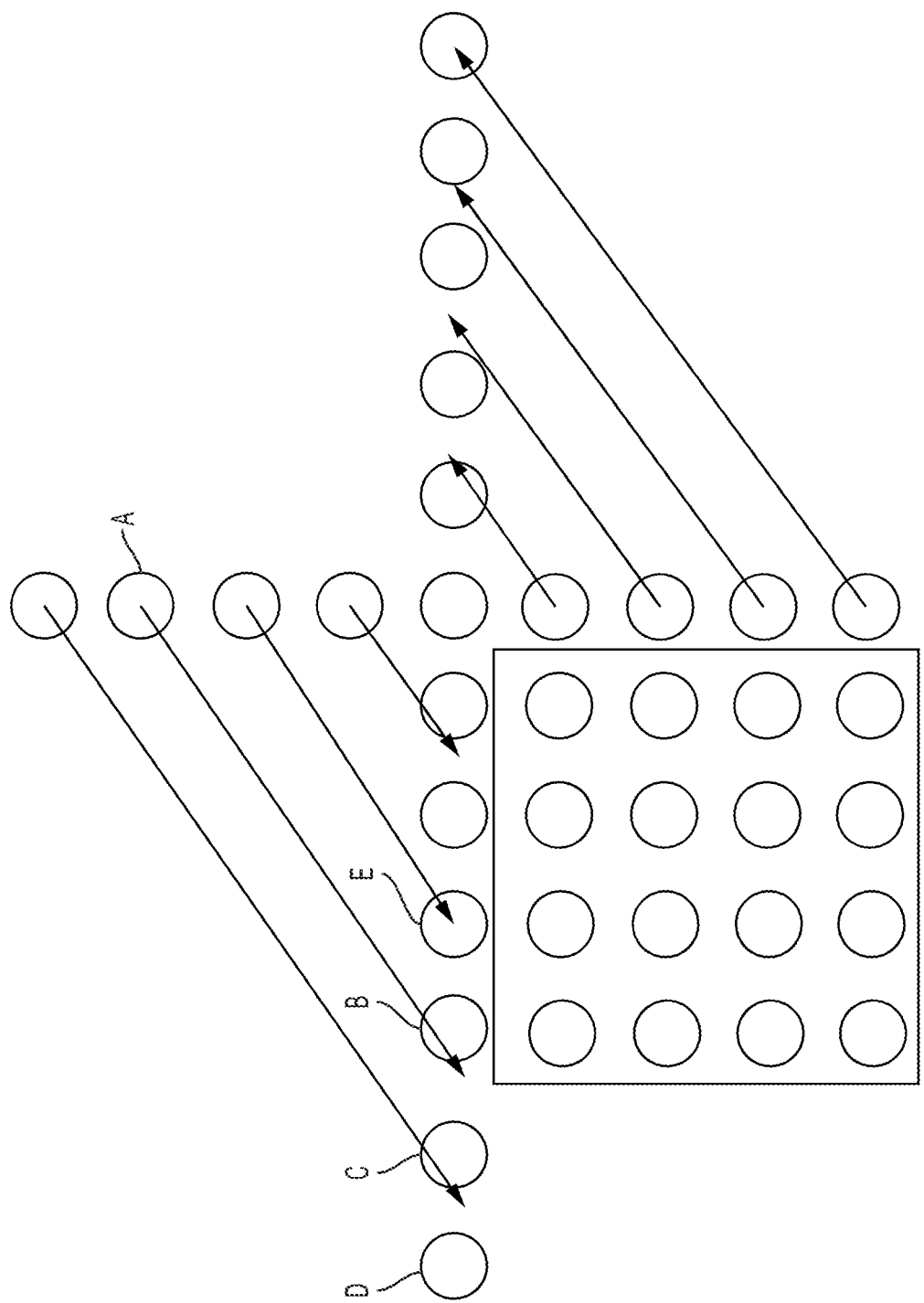
FIG. 14 illustrates an example of filling projected samples based on reconstructed samples using an extended intra prediction mode in accordance with this disclosure.

In yet another example of the present disclosure, samples in (i.e., within or of) a current block may be predicted by projected samples on the right line based on the utilization of extended angular intra prediction mode(s) beyond Vertical −45°. FIG. 14 shows an example where samples on a right line are projected from a top line of reconstructed samples with an angle beyond Vertical −45° (i.e., the extended angular intra prediction mode illustrated with solid arrows). In this example, projected samples on the right line are "filled" based on reconstructed samples of the top line. For instance, sample "A" on the right line is projected to a sub-sample of the top line, which can be interpolated with the neighboring reconstructed samples on the top line by an interpolation filter. In another example, sample "A" on the right line is projected to a sub-sample, which can be approximated by a neighboring reconstructed sample. In FIG. 14, sample "A" on the right line may be projected to sample "B" on the top line as an approximation.

Figure 15:
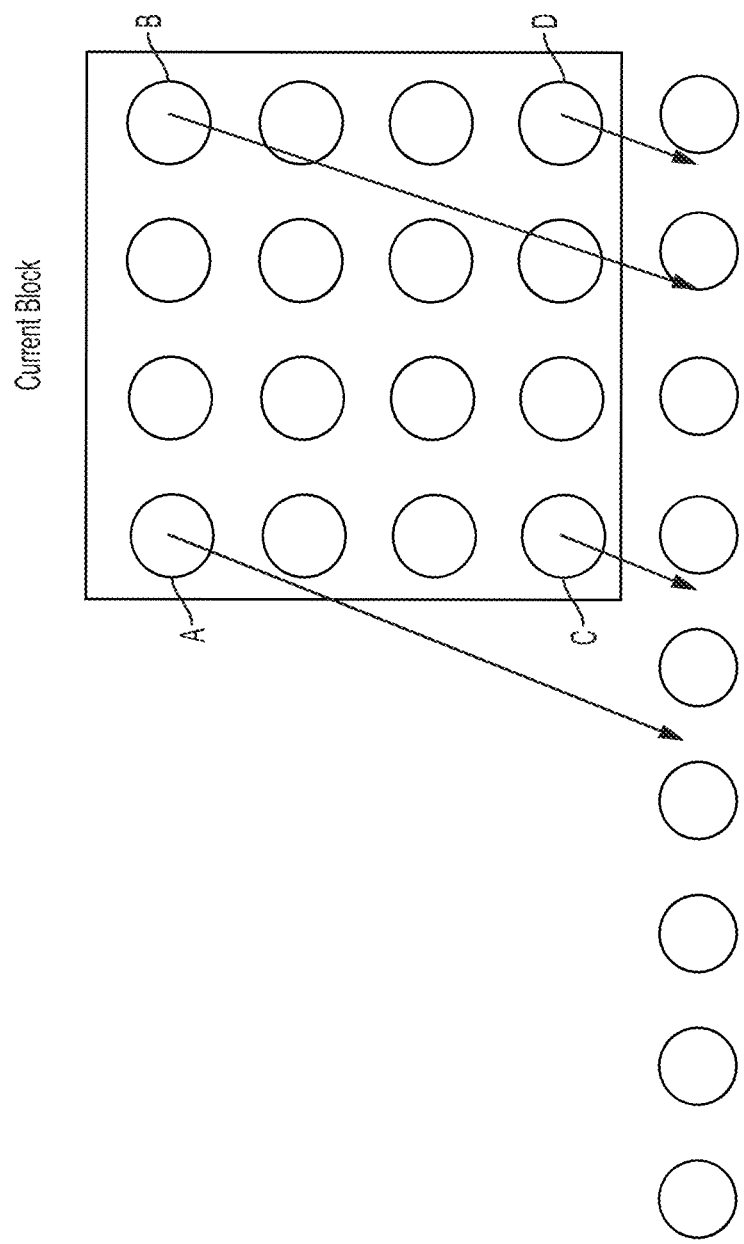
FIG. 15 illustrates another of predicting sample(s) from reconstructed sample(s) using an extended angular intra prediction mode in accordance with this disclosure.

In yet another example of the present disclosure, samples in (i.e., within or of) a current block are predicted by reconstructed samples on a bottom line utilizing extended angular intra prediction mode(s) beyond Horizontal −45°. FIG. 15 illustrates an example of predicting samples (marked as "A", "B", "C" and "D") of the current block from reconstructed samples located on a bottom line with an extended angular intra prediction mode. With the angle beyond Horizontal −45° associated with the extended angular intra prediction mode being utilized in FIG. 15, sample "A" is projected to a sample, which may be a sub-sample, on the bottom line. In one example, sample "A" is projected to a sub-sample, which may be interpolated with the neighboring reconstructed samples on the bottom line by an interpolation filter. In another example, sample "A" may be projected to a sub-sample, which may be approximated by a neighboring reconstructed sample.

Figure 16:
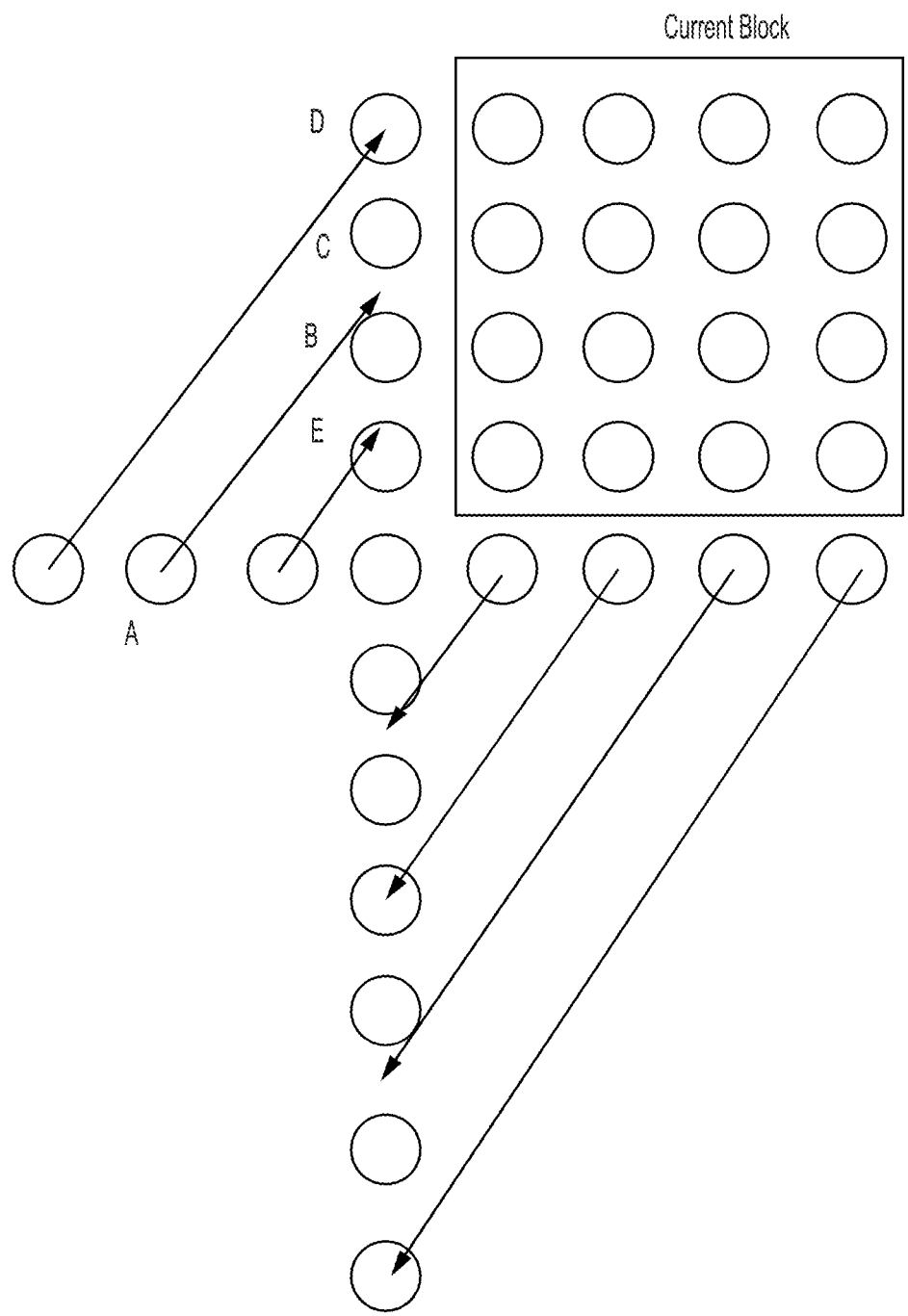
FIG. 16 illustrates another example of filling projected samples based on reconstructed samples using an extended intra prediction mode in accordance with this disclosure.

In yet another example of the present disclosure, samples in a current block may be predicted by projected samples on a bottom line of reconstructed samples based on the utilization of extended angular intra prediction mode(s) beyond Horizontal −45°. FIG. 16 shows an example where samples on a bottom line are projected from a left line with the angle beyond Horizontal −45°. In this example, projected samples on the bottom line are "filled" based on reconstructed samples of the left line. In one example, sample "A" on the bottom line is projected to a sub-sample, which can be interpolated with the neighboring reconstructed samples on the left line by an interpolation filter. In another example, sample "A" on the bottom line is projected to a sub-sample, which can be approximated by a neighboring reconstructed sample. In FIG. 16, the sample on the bottom line "A" can be projected to sample "B" as an approximation.

The extended angular intra prediction modes described in the present disclosure may be applied to the Luma component as well as the Chroma components.

The usage of extended angular intra prediction modes may depend on (i.e., may be based on or responsive to) the availability of neighboring reconstructed modes. For example, with the extended angular intra prediction modes defined in FIGS. 10A & 10B, in the event that top-right reference samples are not available, the extended angular intra prediction modes beyond Vertical −45° (e.g., N5-N8) are not applied (e.g., are restricted from utilization in accordance with the present disclosure or not enabled in accordance with the present disclosure).

In one example, in the event that a neighboring block applies an extended angular intra prediction direction in accordance with the present disclosure and the current block does not apply an extended angular intra prediction direction for deriving the Most Probable Mode (MPM) in intra mode coding, the neighboring extended angular intra prediction direction may be mapped (i.e., associated with or corresponds) to the nearest intra prediction direction (i.e., intra prediction mode) which is available for the current block. For example, with the extended angular intra prediction modes defined in FIGS. 10A & 10B, modes N5-N8 would be mapped to intra mode 34.

Alternatively, or in addition to the above dependence/basis, the usage of extended angular intra prediction modes, in accordance with the present disclosure, may depend on the shape of the current block. For example, with the extended angular intra prediction modes defined in FIGS. 10A & 10B, when the block width (i.e., the width of the current block) is larger than the block height (i.e., the height of the current block), only the extended angular intra prediction modes beyond Vertical −45° (e.g., N5-N8) may be applicable and the extended angular intra prediction modes beyond Horizontal −45° (e.g., N1-N4) may not be allowed (e.g., are restricted from utilization in accordance with the present disclosure or not enabled in accordance with the present disclosure) to be applied. When the block width is smaller than the block height, only the extended angular intra prediction modes beyond horizontal −45° (e.g., N1-N4) may be applicable and the extended angular intra prediction modes beyond vertical −45° (e.g., N5-N8) may not be allowed to be applied.

In order to keep (i.e., maintain) the same number of intra prediction modes when applying the extended angular intra prediction modes of the present disclosure, the intra prediction directions may be re-distributed, for example but not limited, by shifting some intra prediction directions within the range of extended angular intra prediction directions, e.g., [Horizontal $-(45+\Delta_0)°$, Vertical $-(45+\Delta_0)°$] and/or replacing some original intra prediction directions with the extended angular intra prediction directions of the present disclosure. The redistribution and replacement techniques above are merely exemplary. The present disclosure envisions other techniques to maintain the same number of intra prediction modes based on the utilization of the extended angular intra prediction modes of the present disclosure.

In various implementations of the present disclosure, the current block may be predicted by a weighted sum of an extended angular intra prediction mode and a normal intra prediction mode with the angle between Horizontal −45° and Vertical −45°.

A prediction block P1 is generated for the current block using a normal intra prediction mode M1; and another prediction block P2 is generated for the current block using an extended angular intra prediction mode M2. The final prediction block P may be generated as the weighted sum of P1 and P2 as the formula shown below:

$$P(x,y)=w1(x,y) \times P1(x,y)+w2(x,y) \times P2(x,y),$$

where (x, y) is the coordinate of a sample in the current block. w1 is the weighting value for P1 and w2 is the weighting value for P2.

In one example, $P(x, y)=(w1(x, y) \times P1(x, y)+w2(x, y) \times P2(x, y)+o)>>s$, where w1, w2, o and s are integers. Some constraints may be utilized (i.e., restrictions may be configured). For example, $$w1(x,y)+w2(x,y)=2^s$$

$$o=2s^{-1} 0 \le w1(x,y) \le 2^s,$$

$$0 \le w2(x,y) \le 2^s$$

In another example, w1 and w2 depends on intra prediction mode (IPM), which can be M1 or M2. For example, each mode can have different w1 and w2.

$$P(x,y)=w1(x,y,IPM) \times P1(x,y)+w2(x,y,IPM) \times P2(x,y).$$

In another example, intra prediction modes are classified (e.g., arranged or sorted or assigned) into groups. Each group can have different w1 and w2.

$$P(x,y)=w1(x,y,\text{Group}(IPM)) \times P1(x,y)+w2(x,y,\text{Group}(IPM)) \times P2(x,y).$$

In other implementations, w1 and w2 can be calculated from x, y. In one example, $$w1(x,y,\text{Group}(IPM))=a(\text{Group}(IPM)) \times x+b(\text{Group}(IPM)) \times y+c(\text{Group}(IPM)), \text{ and}$$

$$w2(x,y,\text{Group}(IPM))=1-w1(x,y,\text{Group}(IPM))$$

It can be implemented in an integrated form $$w1(x,y,\text{Group}(IPM))=(a(\text{Group}(IPM)) \times x+b(\text{Group}(IPM)) \times y+c(\text{Group}(IPM))+o)>>s, \text{ and}$$

$$w2(x,y,\text{Group}(IPM))=2^s-w1(x,y,\text{Group}(IPM)).$$

where a(Group(IPM)), b(Group(IPM)), c(Group(IPM)), o and s are integers.

Parameters a(Group(IPM)), b(Group(IPM)) and c(Group(IPM)) may be predefined (i.e., configured) at both an encoder and a decoder; alternatively, or additionally, parameters a(Group(IPM)), b(Group(IPM)) and c(Group(IPM)) may be signaled, by the encoder, to the decoder. Or there can be several predefined parameters at both an encoder and a decoder. The encoder can signal an index associated with a set of predefined parameters to the decoder to indicate which parameter(s) are used.

The present disclosure contemplates constraints being configured by which coding devices (e.g., encoders and/or decoders) may operate in accordance with. For example, $$o=2^{s-1}$$

$$0 \le w1(x,y) \le 2^s, 0 \le w2(x,y) \le 2^s$$

$$0 \le a(\text{Group}(IPM)),b(\text{Group}(IPM)),c(\text{Group}(IPM)) \le 2^k,$$
where k is an integer.

In one example, $w1(x, y, \text{Group}(IPM))=a(\text{Group}(IPM)) \times x^2+b(\text{Group}(IPM)) \times y^2+c(\text{Group}(IPM)) \times x \times y+d(\text{Group}(IPM)) \times x+e(\text{Group}(IPM)) \times y+f(\text{Group}(IPM))$, and $w2(x, y, \text{Group}(IPM))=1-w1(x, y, \text{Group}(IPM))$ It can be implemented (e.g., by a coding device) in an integrated form $$w1(x,y,\text{Group}(IPM))=(a(\text{Group}(IPM)) \times x^2+b(\text{Group}(IPM)) \times y^2+c(\text{Group}(IPM)) \times x \times y+d(\text{Group}(IPM)) \times x+e(\text{Group}(IPM)) \times y+f(\text{Group}(IPM))+o)>>s, \text{ and}$$

$$w2(x,y,\text{Group}(IPM))=2^s-w1(x,y,\text{Group}(IPM)).$$

where a(Group(IPM)), b(Group(IPM)), c(Group(IPM)), d(Group(IPM)), e(Group(IPM)), f(Group(IPM)), o and s are integers.

Parameters a(Group(IPM)), b(Group(IPM)), c(Group(IPM)), d(Group(IPM)), e(Group(IPM)) and f(Group(IPM)) can be predefined at both the encoder and the decoder;

alternatively, or additionally, Parameters a(Group(IPM)), b(Group(IPM)), c(Group(IPM)), d(Group(IPM)), e(Group(IPM)) and f(Group(IPM)) can be signaled from the encoder to the decoder. Alternatively, or additionally several pre-defined parameters may be configured at both the encoder and the decoder. In one implementation, similar to the discussion above, the encoder may signal an index to the decoder to indicate which parameters are used. Some constraints may be utilized in accordance with the present disclosure. For example, $o=2^{s-1}$ $0 \leq w1(x,y) \leq 2^S, 0 \leq w2(x,y) \leq 2^S$ $0 \leq$ a(Group(IPM)), b(Group(IPM)), c(Group(IPM)), d(Group(IPM)), e(Group(IPM)), f(Group(IPM))$\leq 2^k$, where k is an integer.

Figure 17:
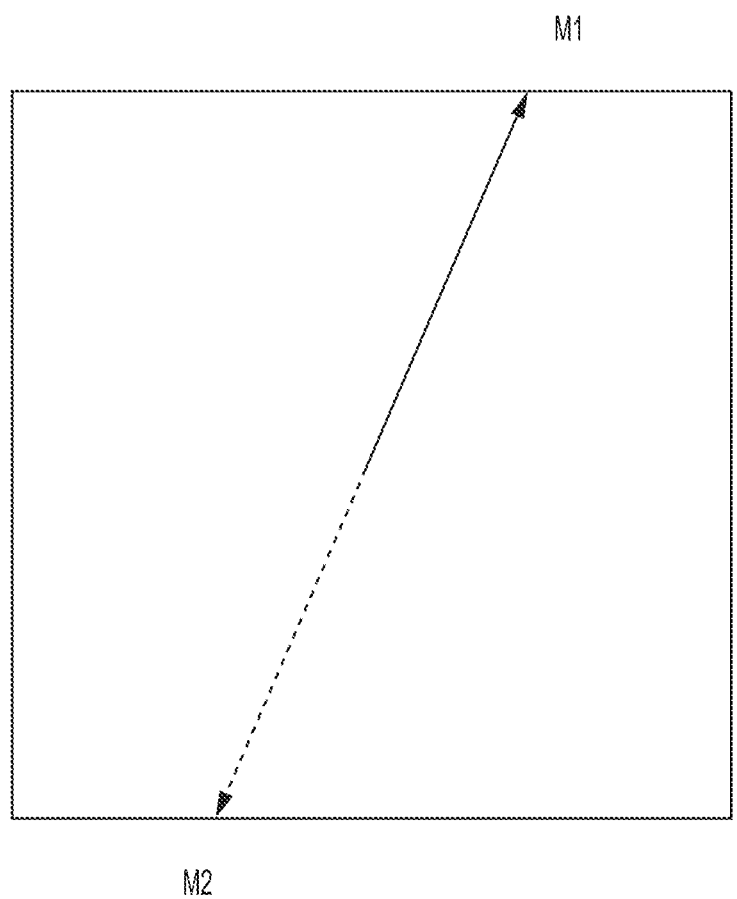
FIG. 17 illustrates an example in which the directions of prediction angles associated with an intra prediction mode defined in HEVC and an extended angular intra prediction mode of the present disclosure are constrained relative to one another.

Alternative to, or in addition to, the other disclosed techniques, the present disclosure contemplates enabling (i.e., configuring) coding devices to constrain the prediction angle of M1 and the prediction angle of M2 to be in opposite directions of one another, or approximately in opposite directions of one another. FIG. 17 illustrates an example where the angles of M1 and M2 are in opposite directions.

In various embodiments of the present disclosure, luma samples may be predicted from chroma samples. The present disclosure contemplates a new prediction technique that enables this prediction of luma samples from chroma samples being referred to as inversed-linear model (iLM) intra prediction.

For example, Pred'$_L$[x, y]=$\alpha$·Rec$_c$[x, y]+$\beta$, where Rec$_c$[x, y] is a chroma reconstructed sample. $\alpha$ and $\beta$ are derived by the neighboring constructed luma and chroma samples with a linear-regression approach. Pred'$_L$[x,y] is a down-sampled luma prediction sample. The prediction block for the luma component can be generated by up-sampling the down-sampled luma prediction samples.

For example, $$Pred'_L[x, y] = \begin{cases} \alpha_1 \cdot Rec_C[x, y] + \beta_1 \text{ if } Rec_C[x, y] \leq T \\ \alpha_2 \cdot Rec_C[x, y] + \beta_2 \text{ if } Rec_C[x, y] > T \end{cases},$$

where Rec$_c$[x,y] is a chroma reconstructed sample. Chroma reconstructed samples are classified into two groups per (e.g., based on) their intensities. $\alpha_1$, $\alpha_2$, $\beta_1$ and $\beta_2$ are derived by the neighboring constructed luma and chroma samples with the linear-regression approach. Pred'$_L$[x,y] is a down-sampled luma prediction sample. The prediction block for the luma component can be generated by up-sampling the down-sampled luma prediction samples.

In accordance with the present disclosure, a flag may be signaled at picture-level, slice-level, coding tree unit (CTU) level, coding unit (CU) level, prediction unit (PU) level and/or transform unit (TU) level to indicate whether iLM is applied. In one example, based on luma samples in a CTU, CU, TU or PU being predicted with the iLM mode, chroma samples in the same CTU, CU, TU or PU cannot be predicted with the LM mode. In one example, based on luma samples in a CTU being predicted with the iLM mode, the coding structures of luma and chroma components must be shared; in this example, the coding structures of luma and chroma components cannot be separated. In yet another example, based on luma samples in a CTU being predicted with the iLM mode, the coding structures of luma and chroma components can be separated, but the information of the chroma component from which iLM derive the luma prediction must be coded before the luma component.

In accordance with the present disclosure, the final luma prediction block can be calculated (i.e., determined or computed) as a weighted sum of the prediction of the iLM mode and the prediction of a normal or extended intra prediction mode.

In various implementations of the present disclosure, intra prediction can be performed in a line-by-line cascading fashion. FIGS. 18A-18D illustrate an example of line-by-line cascading intra prediction of a current block in accordance with the present disclosure. FIGS. 18E-18H illustrate an example of line-by-line cascading intra prediction of a current block utilizing an extended angular intra prediction mode of the present disclosure.

Figure 18A:
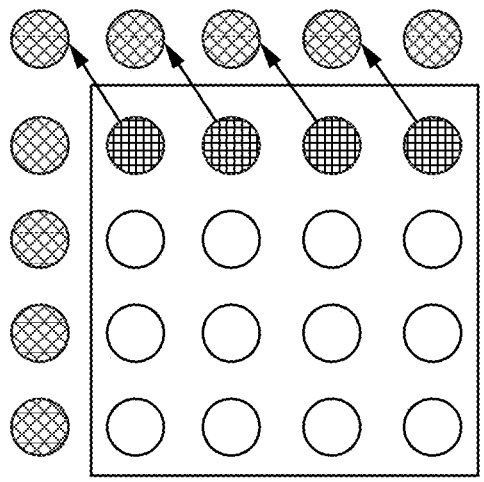
FIGS. 18A-18D illustrate an example of line-by-line cascading intra prediction of a current block in accordance with the present disclosure.
Figure 18B:
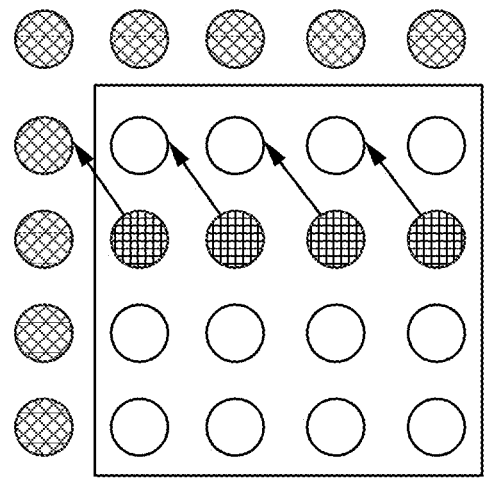
Figure 18C:
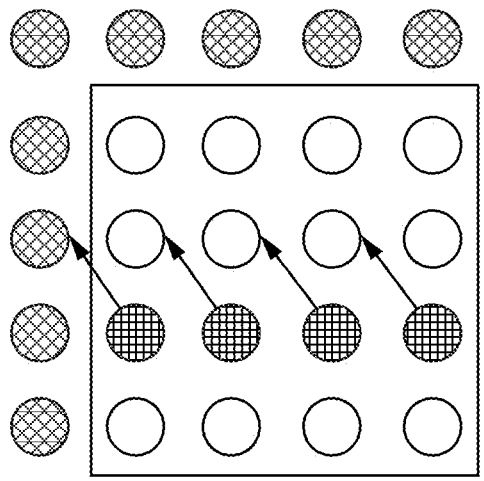
Figure 18D:
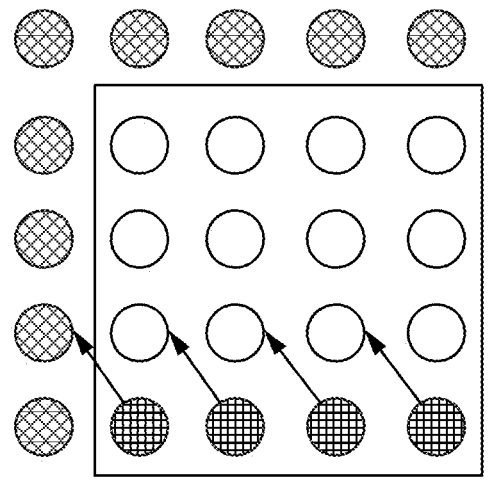

In FIG. 18A, samples in the first row (samples marked in black) from the top of the current block are predicted from reconstructed neighboring samples (samples marked in crosshatching) with the angle associated with a particular prediction mode. In FIG. 18B, samples in the second row (samples marked in black) of the current block are predicted, with an angle associated with a particular prediction mode (e.g., the angle of the prediction mode utilized in predicting samples illustrated in FIG. 18A), from the prediction samples of the first row. Samples of the current block at the boundary in FIG. 18B (e.g., the left-most, black-marked sample of the second row from the top of the current block) may be predicted, using the angle of the associated with the particular prediction mode, from the reconstructed neighboring samples (e.g., samples marked with crosshatching). In FIG. 18C, the third row of samples (samples marked in black) of the current block is predicted (e.g., using the angle associated with the particular prediction mode) from the prediction samples of the second row of the current block and, as shown, a reconstructed neighboring block (marked in crosshatching). In FIG. 18D, the fourth row of samples of the current block (samples marked in black) is predicted from prediction samples of the third row of the current block and, as shown, a reconstructed neighboring block (marked in crosshatching).

Figure 18G:
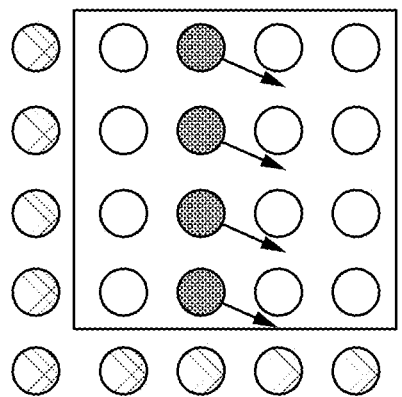
FIGS. 18E-18H illustrate an example of line-by-line cascading intra prediction of a current block utilizing an extended angular intra prediction mode of the present disclosure.
Figure 18F:
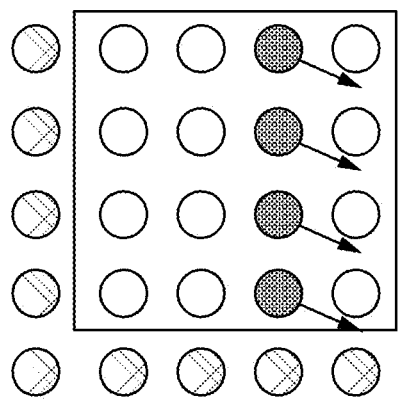
Figure 18H:
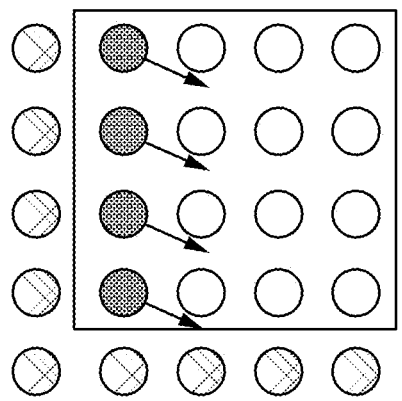
Figure 18E:
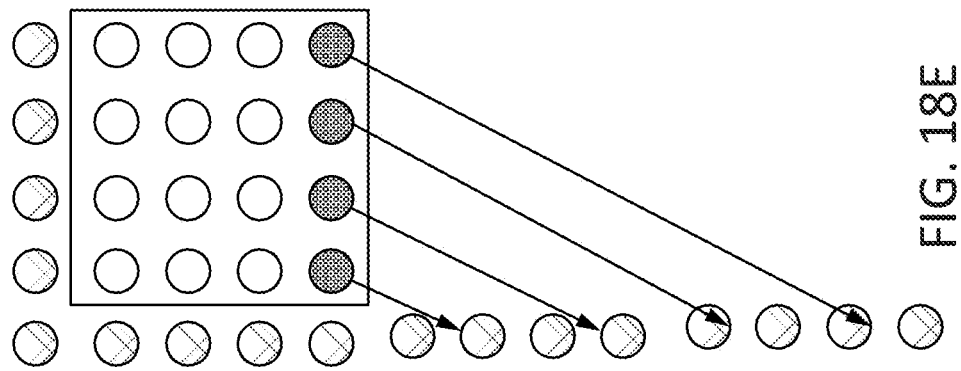

As discussed above, FIGS. 18E-18H illustrate an example of line-by-line cascade intra prediction utilizing an extended angular intra prediction mode of the present disclosure. In FIG. 18E, samples in the fourth row (samples marked in black) from the top of the current block are predicted from reconstructed neighboring samples (samples marked with cross-hatching) using an extended angle of the extended angular intra prediction mode. In FIG. 18F, samples in the third row (samples marked in black) from the top of the current block are predicted, using the extended angle of the extended angular intra prediction mode, from the prediction samples in the fourth row (i.e., the samples of the current block predicted as illustrated in FIG. 18E) of the current block. Samples at a boundary position of the current block (e.g., the left-most, black-marked sample of the third row from the top of the current block) may be predicted from the reconstructed neighboring samples (samples marked with cross-hatching). In FIG. 18G, samples positioned/located in a second row (samples marked in black) from the top of the current block may be predicted from the prediction samples of the third row of the current block and neighboring, reconstructed sample(s) utilizing the extended angle of the extended angular intra prediction mode. Likewise, in FIG. 18H, samples positioned/located in a first row (samples marked in black) from the top of the current block may be predicted from the prediction samples of the second row of the current block and neighboring, reconstructed sample(s) utilizing the extended angle of the extended angular intra prediction mode.

In one example of the present disclosure, the final prediction block may be calculated, by a coding device, as a weighted sum of the prediction of the cascade prediction technique and the prediction of a normal or extended intra prediction mode with the same prediction angle or other prediction angles.

Figure 19:
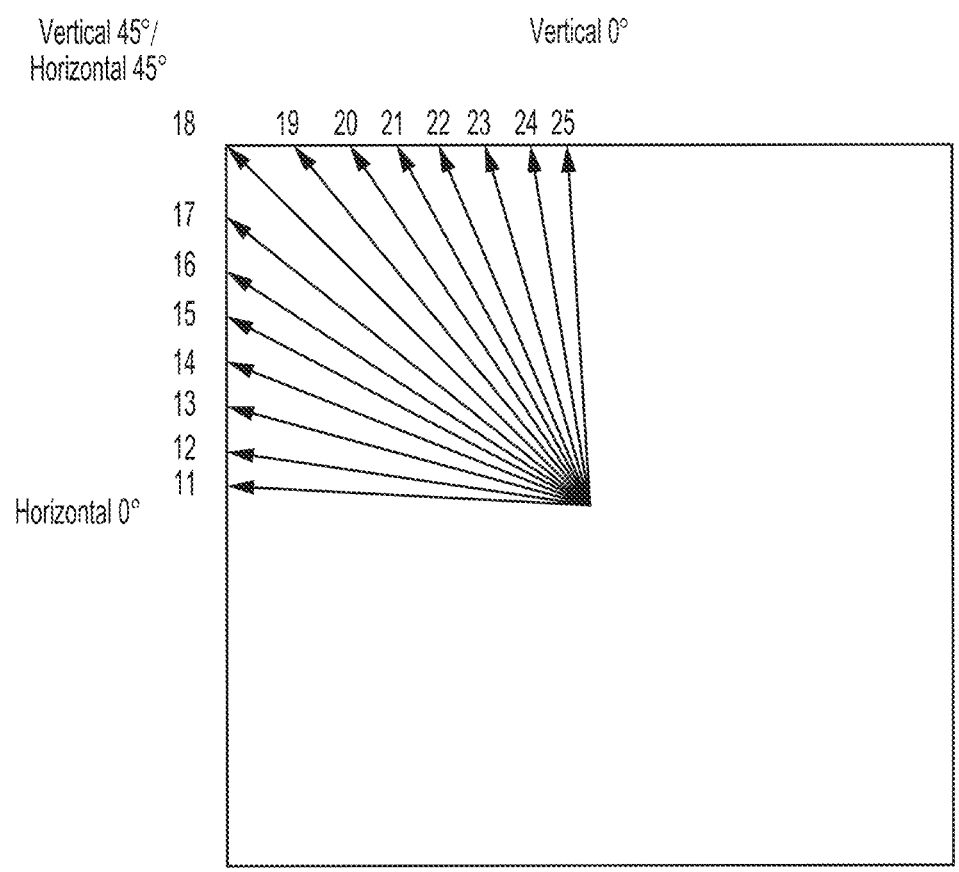
FIG. 19 illustrates an example of line-by-line cascading intra prediction of a current block which is constrained to specific prediction mode(s) in accordance with the present disclosure.

In accordance with the present disclosure, the cascade prediction technique may be constrained to be applied to only some specific prediction modes. In one example, the cascade prediction technique may only be applied to the prediction modes with angles between Horizontal 0° and Vertical 0° as shown in FIG. 19.

In various implementations, when the cascade intra prediction technique of the present disclosure is implemented, an intra prediction direction is signaled by, for example, a source device, however for each row or for each column or a group of rows or a group of columns, a different intra prediction direction may be applied. In such instances, a difference as compared to (i.e., relative to) the signaled prediction direction, or a difference as compared to the intra prediction applied for previous row/column, is signaled.

In yet other implementations, when the cascade intra prediction technique of the present disclosure is implemented, an intra prediction direction (denoted by SIP) is signaled. However for each row or for each column or a group of rows or a group of columns, a different intra prediction direction may be applied, and the intra prediction direction is derived by checking (i.e., determining or computing) the cost of applying each intra prediction direction in the range of (SIP−σ, SIP+σ) on the previous reconstructed rows/columns, and the intra prediction direction with the minimal cost among the plurality of computed costs is derived as the intra prediction direction applied for the current row/column.

Figure 20:
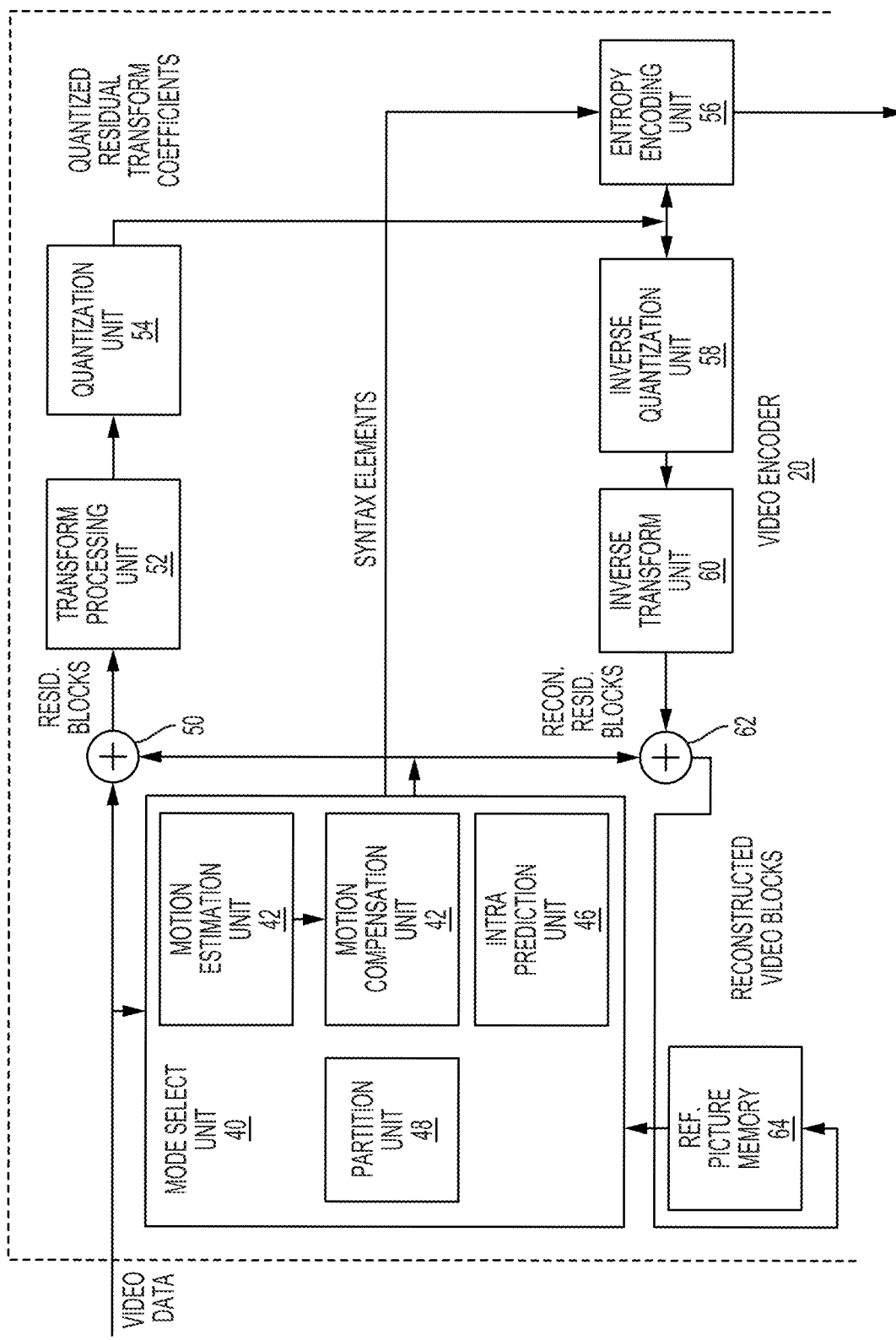
FIG. 20 is a block diagram illustrating an example video encoder that may implement the techniques described in this disclosure.

FIG. 20 is a block diagram illustrating an example of video encoder 20 that may implement techniques for prediction (e.g., extended angular intra prediction modes, cascade intra prediction and/or inversed-linear model intra prediction) described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes. As shown in FIG. 20, video encoder 20 receives a current video block within a video frame to be encoded. In the example of FIG. 20, video encoder 20 includes mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra prediction unit 46, and partition unit 48. For video block reconstruction, video encoder 20 also includes inverse quantization unit 58, inverse transform unit 60, and summer 62. A deblocking filter (not shown in FIG. 20) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra prediction unit 46 may alternatively perform intra predictive encoding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into CTUs, and partition each of the CTUs into sub-CUs based on rate-distortion analysis (e.g., rate-distortion optimization). Mode select unit 40 may further produce a quadtree data structure indicative of partitioning of a CTU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra prediction unit 46 may intra predict a current block, as an alternative to the inter-prediction performed by motion estimation unit 42 and motion compensation unit 44, as described above. In particular, intra prediction unit 46 may determine an intra prediction mode to use to encode a current block. For example, intra prediction unit 46 may implement, for example, extended angular intra prediction modes, cascade intra prediction and/or inversed-linear model intra prediction as described in the present disclosure. In some examples, intra prediction unit 46 may encode a current block using various intra prediction modes, e.g., during separate encoding passes, and intra prediction unit 46 (or mode select unit 40, in some examples) may select an appropriate intra prediction mode to use from the tested modes and/or intra prediction modes described in the present disclosure.

For example, intra prediction unit 46 may calculate rate-distortion values using a rate-distortion analysis for the various tested intra prediction modes, and select the intra prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra prediction unit 46 may calculate ratios from the distortions and rates for the various encoded blocks to determine which intra prediction mode exhibits the best rate-distortion value for the block.

After selecting an intra prediction mode for a block, intra prediction unit 46 may 46 may provide information indicative of the selected intra prediction mode for the block to entropy encoding unit 56. Entropy encoding unit 56 may encode the information indicating the selected intra prediction mode. Video encoder 20 may include in the transmitted bitstream configuration data, which may include a plurality of intra prediction mode index tables and a plurality of modified intra prediction mode index tables (also referred to as codeword mapping tables), definitions of encoding contexts for various blocks, and indications of a most probable intra prediction mode, an intra prediction mode index table, and a modified intra prediction mode index table to use for each of the contexts. As noted above, intra prediction unit 46 may be configured to perform the intra prediction techniques described in this disclosure.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra prediction unit 46 to produce a reconstructed video block for storage in reference picture memory 64. The reconstructed video block may be used by motion estimation unit 42 and motion compensation unit 44 as a reference block to inter-code a block in a subsequent video frame.

Figure 21:
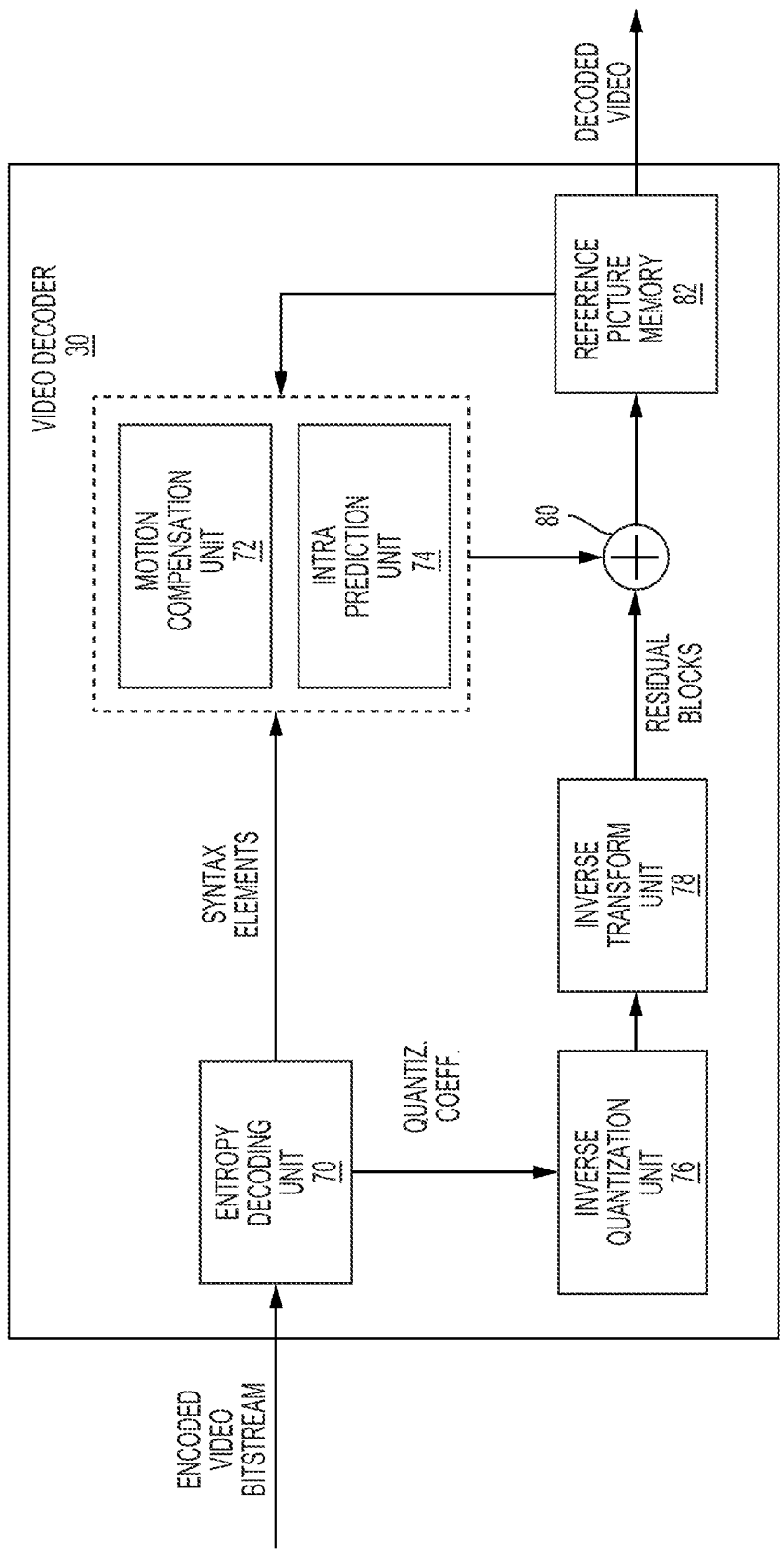
FIG. 21 is a block diagram illustrating an example video decoder that may implement the techniques described in this disclosure.

FIG. 21 is a block diagram illustrating an example of video decoder 30 that may implement techniques for intra prediction described in this disclosure such as extended angular intra prediction modes, cascade intra prediction and/or inversed-linear model intra prediction. In the example of FIG. 21, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 20). Motion compensation unit 72 may generate prediction data based on motion vectors received from entropy decoding unit 70, while intra prediction unit 74 may generate prediction data based on intra prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Intra prediction unit 74 may be configured to perform the intra prediction techniques such as extended angular intra prediction modes, cascade intra prediction and/or inversed-linear model intra prediction described in this disclosure.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

The invention claimed is:

1. A method of encoding or decoding video data, comprising:
   storing a plurality of reconstructed samples of video data in memory;
   intra predicting a first prediction block based on a first angular intra prediction mode and a first one or more reconstructed samples among the plurality of reconstructed samples, the first angular intra prediction mode being among a plurality of angular intra prediction modes associated with a range of angular prediction directions from horizontal −45 degrees to vertical −45 degrees, inclusive, such that the range includes horizontal 0 degrees and vertical 0 degrees;
   intra predicting a second prediction block based on a second angular intra prediction mode and a second one or more reconstructed samples among the plurality of reconstructed samples, the second angular prediction mode being associated with an angular prediction direction that is not within the range of angular prediction directions associated with the plurality of intra prediciton modes;
   encoding or decoding a current block based on the first prediction block and the second prediction block.

2. The method of claim 1 further comprising:
   applying a first weight to the first prediction block to generate a first weighted prediction block;
   applying a second weight to the second prediction block to generate a second weighted prediction block;
   combining the first weighted prediction block and the second weighted prediction block to form a final prediction block; and
   encoding or decoding the current block based on the final prediction block.

3. The method of claim 2 further comprising:
   determining the first weight based on the first angular intra prediction mode used to intra predict the first prediction block; and
   determining the second weight based on the second angular intra prediction mode used to intra predict the second prediction block.

4. The method of claim 3 further comprising:
   determining, based on the first angular intra prediction mode being classified within a first group of angular intra prediction modes, the first weight; and
   determining, based on the second angular intra prediction mode being classified within a second group of angular intra prediction modes, the second weight, wherein the first weight and the second weight are different.

5. An apparatus configured to encode or decode video data, the apparatus comprising:

memory configured to store a plurality of reconstructed samples of video data; and at least one processor in communication with the memory, the at least one processor being configured to:

intra predict a first prediction block based on a first angular intra prediction mode and a first one or more reconstructed samples among the plurality of reconstructed samples, the first angular intra prediction mode being among a plurality of angular intra prediction modes associated with a range of angular prediction directions from horizontal −45 degrees to vertical −45 degrees, inclusive, such that the range includes horizontal 0 degrees and vertical 0 degrees;

intra predict a second prediction block based on a second angular intra prediction mode and a second one or more reconstructed samples among the plurality of reconstructed samples, the second angular prediction mode being associated with an angular prediction direction that is not within the range of angular prediction directions associated with the plurality of intra prediction modes;

encode or decode a current block based on the first prediction block and the second prediction block.

6. The apparatus of claim 5 wherein the at least one processor is further configured to:

apply a first weight to the first prediction block to generate a first weighted prediction block;

apply a second weight to the second prediction block to generate a second weighted prediction block;

combine the first weighted prediction block and the second weighted prediction block to form a final prediction block; and encode or decode the current block based on the final prediction block.

7. The apparatus of claim 6 wherein the at least one processor is further configured to:

determine the first weight based on the first angular intra prediction mode used to intra predict the first prediction block; and determine the second weight based on the second angular intra prediction mode used to intra predict the second prediction block.

8. The apparatus of claim 7 wherein the at least one processor is further configured to:

determine, based on the first angular intra prediction mode being classified within a first group of angular intra prediction modes, the first weight; and determine, based on the second angular intra prediction mode being classified within a second group of angular intra prediction modes, the second weight, where the first weight and the second weight are different.

9. A non-transitory, computer-readable storage medium storing instructions that, when executed, causes one or more processors configured to encode or decode video data to:

intra predict a first prediction block based on a first angular intra prediction mode and a first one or more reconstructed samples among the plurality of reconstructed samples, the first angular intra prediction mode being among a plurality of angular intra prediction modes associated with a range of angular prediction directions from horizontal −45 degrees to vertical −45 degrees, inclusive, such that the range includes horizontal 0 degrees and vertical 0 degrees;

intra predict a second prediction block based on a second angular intra prediction mode and a second one or more reconstructed samples among the plurality of reconstructed samples, the second angular prediction mode being associated with an angular prediction direction that is not within the range of angular prediction directions associated with the plurality of intra prediction modes;

encode or decode a current block based on the first prediction block and the second prediction block.

10. The non-transitory, computer-readable storage medium of claim 9, further storing instructions that, when executed, cause the one or more processors configured to encode or decode video data to:

apply a first weight to the first prediction block to generate a first weighted prediction block;

apply a second weight to the second prediction block to generate a second weighted prediction block;

combine the first weighted prediction block and the second weighted prediction block to form a final prediction block; and encode or decode the current block based on the final prediction block.

11. The non-transitory, computer-readable storage medium of claim 10, further storing instructions that, when executed, cause the one or more processors configured to encode or decode video data to:

determine the first weight based on the first angular intra prediction mode used to intra predict the first prediction block; and determine the second weight based on the second angular intra prediction mode used to intra predict the second prediction block.

12. The non-transitory, computer-readable storage medium of claim 11, further storing instructions that, when executed, cause the one or more processors configured to encode or decode video data to:

determine, based on the first angular intra prediction mode being classified within a first group of angular intra prediction modes, the first weight; and determine, based on the second angular intra prediction mode being classified within a second group of angular intra prediction modes, the second weight, where the first weight and the second weight are different.

13. A method of encoding or decoding video data, comprising:

storing a plurality of reconstructed samples of video data in memory;

intra predicting a first prediction block based on a first intra prediction mode and a first one or more reconstructed samples among the plurality of reconstructed samples, the first intra prediction mode being among a plurality of intra prediction modes associated with a DC mode, a planar mode, and a range of angular prediction directions from horizontal −45 degrees to vertical −45 degrees, inclusive, such that the range includes horizontal 0 degrees and vertical 0 degrees;

intra predicting a second prediction block based on a second intra prediction mode and a second one or more reconstructed samples among the plurality of reconstructed samples, the second prediction mode being associated with an angular prediction direction that is not within the range of angular prediction directions associated with the plurality of intra prediction modes;

encoding or decoding a current block based on the first prediction block and the second prediction block.

14. The method of 13, wherein intra predicting the second prediction block based on the second intra prediction mode and the second one or more reconstructed samples among the plurality of reconstructed samples is based on the first intra prediction mode being among the plurality of intra prediction modes associated with the DC mode, the planar mode, and the range of angular prediction directions from horizontal −45 degrees to vertical −45 degrees.

15. An apparatus configured to encode or decode video data, the apparatus comprising:
   memory configured to store a plurality of reconstructed samples of video data; and
   at least one processor in communication with the memory, the at least one processor being configured to:
      intra predict a first prediction block based on a first intra prediction mode and a first one or more reconstructed samples among the plurality of reconstructed samples, the first intra prediction mode being among a plurality of intra prediction modes associated with a DC mode, a planar mode, and a range of angular prediction directions from horizontal −45 degrees to vertical −45 degrees, inclusive, such that the range includes horizontal 0 degrees and vertical 0 degrees;
      intra predict a second prediction block based on a second intra prediction mode and a second one or more reconstructed samples among the plurality of reconstructed samples, the second prediction mode being associated with an angular prediction direction that is not within the range of angular prediction directions associated with the plurality of intra prediction modes;
      encode or decode a current block based on the first prediction block and the second prediction block.

16. The apparatus of claim 15, wherein the at least one processor is further configured to:
   based on the first intra prediction mode being among the plurality of intra prediction modes associated with the DC mode, the planar mode, and the range of angular prediction directions from horizontal −45 degrees to vertical −45 degrees, intra predict the second prediction block based on the second intra prediction mode and the second one or more reconstructed samples among the plurality of reconstructed samples.

* * * * *